United States Patent
Ko et al.

(10) Patent No.: US 10,256,928 B2
(45) Date of Patent: Apr. 9, 2019

(54) METHOD AND APPARATUS FOR CONTROLLING OPERATION BASED ON DISTANCE BETWEEN TRANSMISSION DEVICE AND RECEPTION DEVICE

(71) Applicant: Samsung Electronics Co., Ltd., Gyeonggi-do (KR)

(72) Inventors: Changgun Ko, Gyeonggi-do (KR); Hun Lim, Gyeonggi-do (KR)

(73) Assignee: Samsung Electronics Co., Ltd (KR)

( * ) Notice: Subject to any disclaimer, the term of this patent is extended or adjusted under 35 U.S.C. 154(b) by 19 days.

(21) Appl. No.: 14/837,777

(22) Filed: Aug. 27, 2015

(65) Prior Publication Data
US 2016/0066123 A1     Mar. 3, 2016

(30) Foreign Application Priority Data
Sep. 3, 2014   (KR) .......................... 10-2014-0116798

(51) Int. Cl.
*H04B 7/00*     (2006.01)
*H04B 17/318*     (2015.01)
(Continued)

(52) U.S. Cl.
CPC .......... *H04B 17/318* (2015.01); *H04B 17/27* (2015.01); *H04W 4/02* (2013.01); *H04W 4/70* (2018.02)

(58) Field of Classification Search
None
See application file for complete search history.

(56) References Cited

U.S. PATENT DOCUMENTS

| 8,233,433 B2 * | 7/2012 | Kalhan | H04W 48/12 370/328 |
| 8,654,235 B2 * | 2/2014 | Im | H04M 1/72572 345/632 |

(Continued)

FOREIGN PATENT DOCUMENTS

| KR | 1020130064014 | 6/2013 |
| KR | 1020140059066 | 5/2014 |

OTHER PUBLICATIONS

International Search Report dated Dec. 30, 2015 issued in counterpart application No. PCT/KR2015/008588, 3 pages.

(Continued)

*Primary Examiner* — Tuan A Tran
(74) *Attorney, Agent, or Firm* — The Farrell Law Firm, P.C.

(57) ABSTRACT

A pre-$5^{th}$-Generation (5G) or 5G communication system is provided for supporting higher data rates Beyond $4^{th}$-Generation (4G) communication system such as Long Term Evolution (LTE). A method of transmitting a beacon signal and a device using the same are provided. The method includes configuring beacon-related information; generating a beacon signal based on the configured beacon-related information; and transmitting the beacon signal, wherein the beacon-related information includes at least one piece of mode information corresponding to distance information between a beacon transmitting device and at least one beacon receiving device. The present disclosure relates to a sensor network, machine type communication (MTC), machine-to-machine (M2M) communication, and technology for Internet of Things (IoT). The present disclosure may be applied to intelligent services based on the above technologies, such as smart home, smart building, smart city, (Continued)

smart car, connected car, health care, digital education, smart retail, security and safety services.

14 Claims, 16 Drawing Sheets

(51) Int. Cl.
    *H04B 17/27*     (2015.01)
    *H04W 4/70*     (2018.01)
    *H04W 4/02*     (2018.01)

(56) References Cited

U.S. PATENT DOCUMENTS

| | | | |
|---|---|---|---|
| 8,817,712 B2* | 8/2014 | Shin | H04W 4/00 370/329 |
| 8,818,269 B2* | 8/2014 | Dorsey | G06F 17/30035 455/41.1 |
| 8,847,754 B2 | 9/2014 | Buchheim et al. | |
| 8,917,623 B2* | 12/2014 | Peng | G01S 5/0215 370/252 |
| 8,965,398 B2 | 2/2015 | Zhu et al. | |
| 8,971,923 B2 | 3/2015 | Alizadeh-Shabdiz et al. | |
| 9,307,355 B2* | 4/2016 | Nehrenz | H04W 4/02 |
| 2004/0157591 A1* | 8/2004 | Hsu | H04M 15/06 455/415 |
| 2007/0214041 A1* | 9/2007 | Patel | G06Q 30/02 705/14.55 |
| 2009/0069033 A1* | 3/2009 | Karstens | H04W 4/02 455/456.3 |
| 2013/0072173 A1* | 3/2013 | Brady | H04M 19/04 455/418 |
| 2013/0143499 A1 | 6/2013 | Ando et al. | |
| 2013/0275221 A1 | 10/2013 | Zeto, III et al. | |
| 2014/0045525 A1 | 2/2014 | Alizadeh-Shabdiz et al. | |
| 2014/0087752 A1 | 3/2014 | Zhu et al. | |
| 2014/0135042 A1 | 5/2014 | Buchheim et al. | |
| 2015/0140982 A1* | 5/2015 | Postrel | H04W 4/008 455/418 |
| 2015/0195334 A1* | 7/2015 | Chew | H04W 4/008 705/40 |

OTHER PUBLICATIONS

European Search Report dated Mar. 16, 2018 issued in counterpart application No. 15838225.9-1213, 11 pages.

\* cited by examiner

METHOD AND APPARATUS FOR CONTROLLING OPERATION BASED ON DISTANCE BETWEEN TRANSMISSION DEVICE AND RECEPTION DEVICE

PRIORITY

This application claims priority under 35 U.S.C. § 119(a) to a Korean Patent Application filed on Sep. 3, 2014 in the Korean Intellectual Property Office and assigned Serial No. 10-2014-0116798, the entire disclosure of which is incorporated herein by reference.

BACKGROUND

1. Field of the Disclosure

The present disclosure relates generally to a method and an apparatus for controlling an operation based on a distance between a transmission device and a reception device, and more particularly, to a method and an apparatus for providing a service based on a distance between a beacon transmitting device and a beacon receiving device.

2. Description of the Related Art

To meet the demand for wireless data traffic which has increased since the deployment of 4G communication systems, efforts have been made to develop an improved 5G or pre-5G communication system, where a 5G or pre-5G communication system is also referred to as a "Beyond 4G Network" or a "Post LTE System."

A 5G communication system is considered to be implemented in higher frequency (mmWave) bands, e.g., 60 GHz bands, so as to provide higher data rates. To decrease propagation loss of radio waves and increase transmission distance, beamforming, massive multiple-input multiple-output (MIMO), full dimensional MIMO (FD-MIMO), array antenna, analog beam forming, and large scale antenna techniques are considered for 5G communication systems.

In addition, in 5G communication systems, development for system network improvement is under way based on advanced small cells, cloud radio access networks (RANs), ultra-dense networks, device-to-device (D2D) communication, wireless backhaul, moving network, cooperative communication, coordinated multi-points (CoMP), reception-end interference cancellation and the like.

In a 5G system, hybrid frequency shift keying (FSK), Feher's quadrature amplitude modulation (FQAM), and sliding window superposition coding (SWSC), as an advanced coding modulation (ACM), and filter bank multi carrier (FBMC), non-orthogonal multiple access (NOMA), and sparse code multiple access (SCMA) an advanced access technology, have been developed.

As a communication technique that replaces near field communication (NFC) corresponding to short-range wireless communication, a Bluetooth low energy (BLE) beacon using BLE is currently being discussed. The BLE beacon has been developed to provide not only simple location information but also various services such as situation marketing, purchasing, and automatic check-in.

BLE has an advantage of low power consumption with which a wireless communication service can be provided for one year or longer using one coin-sized battery. The number of slave devices is limited to about 7 in a previous version of a Bluetooth communication method, but synchronization with limitless slave devices can be achieved from the latest version BLE 4.0, thereby increasing availability.

While NFC has an effective communication distance ranging from about 4 cm to 20 cm, communication using a BLE beacon has an extended effective communication distance ranging from about 5 cm to 50 m. Further, while NFC requires a separate integrated circuit or chip in each electronic device, a BLE beacon can perform short range wireless communication through the BLE beacon if there is a module for supporting BLE communication. As described above, since communication using a BLE beacon is more economical than NFC and may provide a wireless communication service in a wide indoor space, various communication methods using a BLE beacon are being discussed.

For example, when a user having a mobile device such as a mobile phone enters a store that provides a beacon, customized information such as a characteristic and price of a product and a related product purchase history of the user may be automatically provided to the user. Further, when the user enters a hotel lobby, a welcoming message may be provided on the screen of the mobile phone rather than by a hotel employee and required information such as guide information on each facility of the hotel including a swimming pool or a restaurant may be provided in a message form through the recognition of a location of the mobile phone. Further, when the user goes near a work of art in a museum or an exhibition, information on the work of art may be automatically provided in a voice, text message or video form through the mobile phone.

However, in a conventional service using a beacon, a beacon generator that generates a beacon is fixed to a particular location, and a terminal that can receive the beacon moves with a user. Accordingly, all terminals within the corresponding beacon coverage area receive the same data which is generated by the beacon generator. Individuals cannot select information which they desire to receive and receipt of information, which has not been verified, cannot be prevented. Therefore, in a state where BLE-related beacon service is expanding, information provided through a beacon service is arranged and filtered, and, when a customer having a mobile device such as a mobile phone enters a store that has a beacon terminal, customized information is automatically provided to the customer. Since features and a price of a product, and related product purchase histories of the customer are shown at a glance, the customer need not have to ask a store employee for assistance. Accordingly, an efficient storage method is required.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology," "wired/wireless communication and network infrastructure," "service interface technology," and "security technology" have been demanded for IoT implementation, a sensor network, a machine-to-machine (M2M) communication, machine type communication (MTC), and so forth have been recently researched.

Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing information technology (IT) and various industrial applications.

SUMMARY

An aspect of the present disclosure is to provide a method and an apparatus for controlling an operation based on a distance between a transmission device and a reception device.

Another aspect of the present disclosure is to provide a method and an apparatus for providing a service based on a distance between a transmission device using a beacon and a reception device.

Another aspect of the present disclosure is to provide a method and an apparatus for providing a service based on a distance between a transmission device using a BLE beacon and a reception device.

Another aspect of the present disclosure is to provide a method and an apparatus for providing a service using a mobile beacon transmitting device.

Another aspect of the present disclosure is to provide a method of providing a new beacon field including distance information and a service type, and a method and an apparatus for providing a service using the same.

In accordance with an aspect of the present disclosure, a method of transmitting a beacon signal is provided. The method includes configuring beacon-related information; generating a beacon signal based on the configured beacon-related information; and transmitting the beacon signal, wherein the beacon-related information includes at least one piece of mode information corresponding to distance information between a beacon transmitting device and at least one beacon receiving device.

In accordance with another aspect of the present disclosure, a beacon transmitting device for transmitting a beacon signal is provided. The beacon transmitting device includes a communication unit configured to communicate with at least one network node; and a beacon controller configured to control configuration of beacon-related information, generate a beacon signal based on the configured beacon-related information, and transmit the beacon signal, wherein the beacon-related information includes at least one piece of mode information corresponding to distance information between a beacon transmitting device and at least one beacon receiving device.

In accordance with another aspect of the present disclosure, a method of providing information by a server is provided. The method includes receiving mode information on a beacon service; generating control information based on the mode information; and transmitting the control information to an output device, wherein the mode information is identified from a beacon signal transmitted by a beacon transmitting device, and the beacon signal includes mode information corresponding to at least one piece of distance information.

In accordance with another aspect of the present disclosure, an apparatus of a server for providing information is provided. The apparatus includes a communication unit configured to communicate with at least one network node; and a controller configured to control reception of mode information concerning a beacon service, generate control information based on the mode information, and transmit the control information to an output device, wherein the mode information is identified from a beacon signal transmitted by a beacon transmitting device, and the beacon signal includes mode information corresponding to at least one piece of distance information.

BRIEF DESCRIPTION OF THE DRAWINGS

The above and other aspects, features and advantages of the present disclosure will be more apparent from the following detailed description, taken in conjunction with the accompanying drawings, in which.

DETAILED DESCRIPTION OF EMBODIMENTS OF THE PRESENT DISCLOSURE

Figure 1:
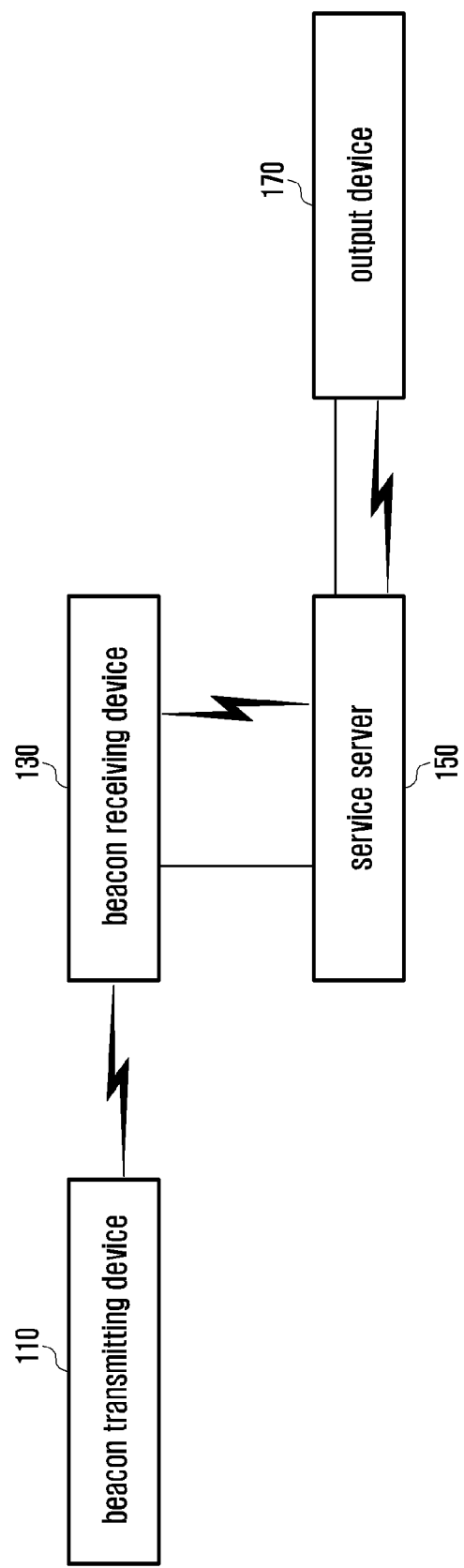
FIG. 1 is a block diagram of a beacon service providing system according to an embodiment of the present disclosure.

Hereinafter, various embodiments of the present disclosure are described with reference to the accompanying drawings. It should be noted that the same elements will be designated by the same reference numerals although they are shown in different drawings. Further, a detailed description of a known function and a configuration which may make the subject matter of the present disclosure unclear is omitted. Hereinafter, it should be noted that descriptions are only provided that may help in the understanding of the operations provided in association with the various embodiments of the present disclosure, and other descriptions are omitted to avoid making the subject matter of the present disclosure rather unclear.

According to an embodiment of the present disclosure, a beacon may refer to a device that transmits a uniform signal to indicate a location or a signal that is generated by the corresponding device.

In addition, the signal generated by a beacon according to an embodiment of the present disclosure may be transferred through a wireless communication scheme such as infrared communication or Bluetooth communication. Although the following description is mainly based on a beacon using BLE in embodiments of the present disclosure, the scope of the present disclosure is not limited thereto and various wireless communication methods can be applied.

A mobile beacon generator according to an embodiment of the present disclosure may include a beacon generator included in a movable terminal or a beacon generator may be a movable terminal. A mobile terminal may support a communication function during movement.

An entity of a system included in a beacon service according to an embodiment of the present disclosure may subscribe to a beacon service when needed. Each entity of a system may subscribe to at least one beacon service and the beacon service may be set to the entity. When a beacon transmitting device is a wearable device, a user may subscribe to the beacon service through a main device paired with the corresponding wearable device, that is, a smart phone. When a user of the beacon transmitting device subscribes to a beacon service, the user may pre-register a device to be used according to each account of the user.

FIG. 1 is a block diagram of a beacon service providing system according to an embodiment of the present disclosure. The beacon service providing system according to an embodiment of the present disclosure may provide a service method of providing different amounts of information according to a distance between a beacon transmitting device 110 and a beacon receiving device 130. Further, the beacon service providing system may provide a method of providing different priorities to information according to a distance between the beacon transmitting device 110 and the beacon receiving device 130.

Referring to FIG. 1, the beacon service providing system may include the beacon transmitting device 110, the beacon receiving device 130, and a service server 150. The beacon service providing system may further include an output device 170.

The beacon transmitting device 110 may transmit a beacon signal periodically or aperiodically. A method of transmitting a beacon signal may use a broadcast signal transmitting scheme, a multicast signal transmitting scheme, or a unicast signal transmitting scheme for a particular reception device. According to an embodiment of the present disclosure, the beacon transmitting device 110 may be a mobile beacon transmitting device which can move. The mobile beacon transmitting device may be a beacon transmitting device which is a different type from a conventional beacon transmitting device. According to a conventional fixed beacon transmitting device, a transmission device that transmits a beacon signal in a fixed location and a reception device that receives a beacon signal uses a particular service based on the beacon signal.

However, according to an embodiment of the present disclosure, the beacon transmitting device 110 may move while transmitting the beacon signal. The mobile beacon transmitting device may map, to the transmitted beacon signal, at least one piece of service identification information (e.g. identification (ID) information) corresponding to at least one piece of distance information between the beacon transmitting device 110 and the beacon receiving device 130. The ID information may indicate service information or operation information. According to an embodiment of the present disclosure, when a beacon signal is transmitted from a viewpoint of the beacon transmitting device 110, operation information or service information indicated by service ID information mapped to distance information is configured to be performed, so that there is an advantage of arranging or filtering the information from the viewpoint of the beacon transmitting device 110.

According to an embodiment of the present disclosure, the beacon transmitting device 110 may be an electronic device having a beacon transmitting function. For example, the electronic device may include at least one of a smart phone, a tablet personal computer (PC), a mobile phone, an electronic book (e-book) reader, a portable multimedia player (PMP), a moving picture experts group audio layer 3 (MP3) player, a mobile medical device, a camera, and a wearable device (for example, electronic glasses, electronic clothes, an electronic bracelet, an electronic necklace, an electronic tattoo, or a smart watch).

The beacon transmitting device 110 may transmit a beacon signal in a preset transmission range. There is no limitation on the type, size, and form of the signal generated by the beacon transmitting device 110. Although a Bluetooth communication scheme, more specifically BLE of the Bluetooth communication scheme, is described as an example in an embodiment of the present disclosure, the scope of the present disclosure is not limited thereto.

The beacon transmitting device 110 may generate and transmit a beacon signal. Application or program information for generating a beacon signal may be installed in the beacon transmitting device 110. When the beacon transmitting device 110 generates a beacon signal, the beacon transmitting device 110 may generate additional information corresponding to distance information. The additional information includes service ID information corresponding to the distance information. The service ID information may indicate particular service information or operation information. That is, when the beacon transmitting device 110 transmits the beacon signal according to an embodiment of the present disclosure, the beacon transmitting device 110 may configure ID information corresponding to distance information, so the beacon receiving device 130 having received the beacon signal or the service server 150 may perform an operation indicated by service ID information corresponding to the distance information configured when the beacon transmitting device 110 generates the beacon signal.

The beacon transmitting device 110 may communicate with the beacon receiving device 130 and the service server 150. The beacon transmitting device 110 may receive a response signal from the service server 150 according to a result of an identification of distance information by the beacon receiving device 130 which received a beacon signal. The beacon transmitting device 110 may perform a preset operation corresponding to a received response signal.

The beacon receiving device 130 may be connected to the beacon transmitting device 110 through wireless communication. The beacon receiving device 130 may receive a beacon signal from the beacon transmitting device 110. The beacon receiving device 130 may transfer information to the service server 150 based on a received beacon signal. The beacon receiving device 130 may directly transfer a received signal to the service server 150 or may transfer information extracted from a beacon signal received by the beacon receiving device 130 to the service server 150. A beacon signal may include various pieces of information. For example, a beacon signal may include a unique identifier of the beacon transmitting device 110, information on a transmission power strength of the beacon signal, or encryption key information of the beacon signal. According to an embodiment of the present disclosure, a beacon signal may include distance information configured by the beacon transmitting device 110 and service ID information corresponding to the distance information. The beacon receiving device 130 may identify information included in a beacon signal.

Further, the beacon receiving device 130 may transmit information identified in a beacon signal to the service server 150.

According to an embodiment of the present disclosure, the beacon receiving device 130 may estimate a distance between the beacon transmitting device 110 which transmitted a beacon signal and the beacon receiving device 130 based on the received beacon signal. A distance estimation may be used as a distance measurement, a distance calculation, or a distance identification. The beacon receiving device 130 may estimate a distance between the beacon transmitting device 110 and the beacon receiving device 130 through various methods. For example, the beacon receiving device 130 may use received signal strength information on a received beacon signal. A location estimation method is not limited thereto, and a detailed location estimation method is described below.

The beacon receiving device 130 may transmit distance information determined based on a result of an estimation of distance to the service server 150. The beacon receiving device 130 may transmit distance information to the service server 150 and also transmit service ID information corresponding to the estimated distance information to the service server 150. The service ID information may indicate particular service information or operation information, or particular level information. The beacon receiving device 130 and the beacon service server 150 may be connected to each other through a wire or wirelessly.

According to an embodiment of the present disclosure, the beacon receiving device 130 may be a door lock. For example, a door lock may generally refer to a locking device of a door using an electronic device. According to an embodiment of the present disclosure, the door lock may support short range wireless communication. The door lock may receive a beacon through wireless communication. By using the beacon receiving device 130 for a locking device around a door such as a door lock, an effect of the mobile beacon transmitting device 110 can be improved. That is, there is an advantage of using distance information related to information on a user's access to a particular space rather than an absolute location relation between a location of the user using the beacon transmitting device 110 and the particular space.

The service server 150 may receive information on a beacon signal transmitted by the beacon transmitting device 110 from the beacon receiving device 130. The information may include distance information between the beacon transmitting device 110 and the beacon receiving device 130. Further, the information may include service ID information corresponding to the distance information. The service ID information may include particular service information or operation information.

Mapping table information for distance information, service information, or operation information corresponding to the service ID information may be stored or configured in the service server 150. The service server 150 may transmit a corresponding control message to the output device 170 or a response signal to the beacon transmitting device 110 based on information received from the beacon receiving device 130 and the mapping table information. According to an embodiment of the present disclosure, the output device 170 may be the same as the beacon transmitting device 110. That is, the beacon transmitting device 110 may be the output device 170 that receives the control message from the service server 150. Meanwhile, the service server 150 may perform the function of the output device 170.

The service server 150 may store subscription information on a user who subscribes to a beacon service. The user subscription information may include at least one of a unique user identifier (UUID), a unique identifier of a mobile beacon transmitting device 110 by which the user receives information according to a beacon service, information on an authentication key for verifying a mobile beacon transmitting device of a user, a number of transmission devices to be used after a user subscribes to a beacon service, and information on a service plan to which a user subscribes. The service server 150 may store and use mapping tables, which are different according to users or beacon transmitting devices 110 or operation mode configuration information based on user identification information or beacon transmitting device 110 identification information.

The output device 170 may be an electronic device which can operate according to a control of the service server 150. The electronic device may be a smart home device. The smart home device refers to a medium that is connected through a wired/wireless home network to allow home appliances within a home and a house to become intelligent, so as to improve the quality of life and provide various services. The smart home device may be an electronic device such as a door lock, a TV, a robot cleaner, an oven, a washing machine, a computer, a printer, a camera, a refrigerator, a lighting fixture, or an air conditioner, which may receive a control command from the service server 150 to operate based on the control command.

In addition, the smart home device may directly communicate with the beacon transmitting device 110 without intervention of the service server 150. When the smart home device communicates directly with the beacon transmitting device 110, the smart home device may be an electronic device having functions of the beacon receiving device 130 and the service server 150.

In the beacon service providing system of FIG. 1, the number of beacon transmitting devices 110 may be plural. That is, the beacon receiving device 130 and the service server 150 may communicate with a plurality of beacon transmitting devices 110. Further, in the beacon service providing system of FIG. 1, the number of beacon receiving devices 130 may be plural. The beacon transmitting device 110 may communicate with a plurality of beacon receiving devices 130, and the service server 150 may communicate with a plurality of beacon receiving devices 130 through a wired or wireless connection. Further, in the beacon service providing system of FIG. 1, the number of output devices 170 may be plural. The service server 150 may communicate with a plurality of output devices 170 through a wired or wireless connection and control the output devices 170.

Although the beacon receiving device 130 and the service server 150 are illustrated as different entities in FIG. 1, embodiments of the present disclosure are not limited thereto, and the beacon receiving device 130 may be included in the service server 150 or the service server 150 may be included in the beacon receiving device 130. Meanwhile, if the beacon receiving device 130 and the service server 150 are configured as one service entity, the service entity may perform the aforementioned functions of the beacon receiving device 130 and the service server 150.

The function of the beacon receiving device 130 according to an embodiment of the present disclosure is not limited to a simple function of transmitting a beacon signal received from the service server 150 or identified information in a beacon signal, and the beacon receiving device 130 may be a smart home device that performs various functions according to a received beacon signal. That is, the beacon receiving device 130 may be a smart home device operating after receiving a beacon signal from the beacon transmitting device 110, transmitting information on a beacon signal to the service server 150, and receiving a control message from the service server 150.

Figure 2:
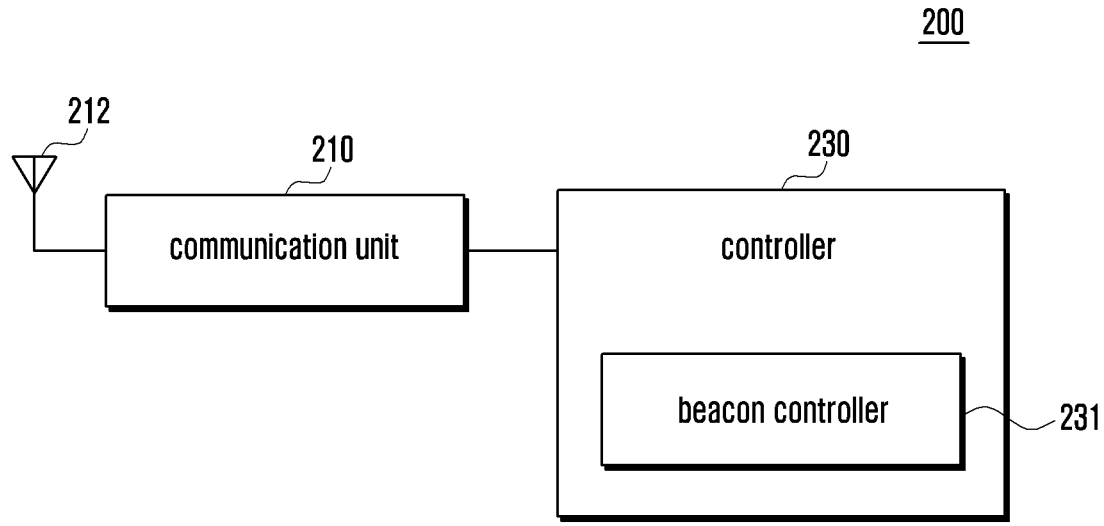
FIG. 2 is a block diagram of a terminal according to an embodiment of the present disclosure.

FIG. 2 is a block diagram of a terminal 200 according to an embodiment of the present disclosure. The terminal 200 according to an embodiment of the present disclosure may be a beacon transmitting device.

Referring to FIG. 2, the terminal 200 (or user equipment (UE) may include a communication unit 210, an antenna 212, and a controller 230. The terminal 200 may further include a storage unit for storing information for the performance of a beacon service, a display unit for displaying a state of the terminal 200, and an input unit for inputting a control command into the terminal 200. Further, the UE 200 may further include a sensor unit including a global positioning system (GPS) module for receiving a GPS signal and other sensor modules.

The terminal 200 may communicate with at least one network node through the communication unit 210. The communication unit 210 may include a radio frequency (RF) transmitting device for up-converting and amplifying a frequency of a transmitted signal and an RF receiving device for low noise-amplifying a received signal and down-converting a frequency of a received signal. Further, the communication unit 210 may include a modulator and a demodulator. The modulator and the demodulator may include code division multiple access (CDMA), wideband CDMA (WCDMA), long term evolution (LTE), wireless fidelity (Wi-Fi), wireless broadband (WiBro), Bluetooth, NFC, etc. The communication unit 210 may be a mobile communication module, an Internet communication module and/or a short range communication module. Further, the communication unit 210 according to an embodiment of the present disclosure may transmit a beacon signal according to control of the controller 230. The communication unit 210 may receive a response signal in response to a transmission of a beacon signal. The communication unit 210 according to an embodiment of the present disclosure may be a communication module supporting BLE.

The controller 230 may control a general operation of the terminal 200. The controller 230 according to an embodiment of the present disclosure may further include a beacon controller 231. The beacon controller 231 may control the generation and transmission of a beacon signal. Further, the beacon controller 231 may control the reception of a response signal of a transmitted beacon signal and the performance of an operation corresponding to a response signal.

According to an embodiment of the present disclosure, the beacon controller 231 may control the configuration of beacon-related information, to generate a beacon signal based on the configured beacon-related information, and the transmission of the beacon signal. Beacon-related information may include at least one piece of mode information corresponding to distance information between a beacon transmitting device and at least one beacon receiving device. A beacon signal may be used by a service server for controlling mode information corresponding to distance information between a beacon receiving device, which receives a beacon signal, and a beacon transmitting device. The distance between a beacon transmitting device and a beacon receiving device may be determined based on received signal strength information (RSSI) on a beacon signal transmitted by a beacon transmitting device.

According to an embodiment of the present disclosure, the beacon controller 231 may insert operation information corresponding to distance information into a data file of a beacon signal field to control the generation of a beacon signal.

According to an embodiment of the present disclosure, the beacon controller 231 may control the configuration of operation information corresponding to a change in an increase/decrease of a distance between a beacon transmitting device and a beacon receiving device to configure beacon-related information.

According to an embodiment of the present disclosure, the beacon controller 231 may apply a weighted value to distance information or operation information in accordance with a movement speed of a beacon transmitting device to control the configuration of beacon-related information.

According to an embodiment of the present disclosure, the beacon controller 231 may control the reception of a response signal of a beacon signal and the performance of an operation corresponding to a response message. In this case, a response message may include operation information for executing mode information corresponding to distance information between a beacon receiving device, which has received a beacon signal, and a beacon transmitting device.

Although the terminal 200 has been described as including separated blocks, it is only for convenience of description, and the terminal 200 according to the present disclosure is not limited thereto. For example, the operations, which are performed by the beacon controller 231, may be performed by the controller 230. Further, according to an embodiment of the present disclosure, the operations of the terminal 200 or a beacon transmitting device are not limited to the operations described in FIG. 2, and the controller 230 of the terminal 200 or a beacon transmitting device may perform the operations of the terminal 200 or a beacon transmitting device described above and below in FIGS. 1 to 14.

Figure 3:
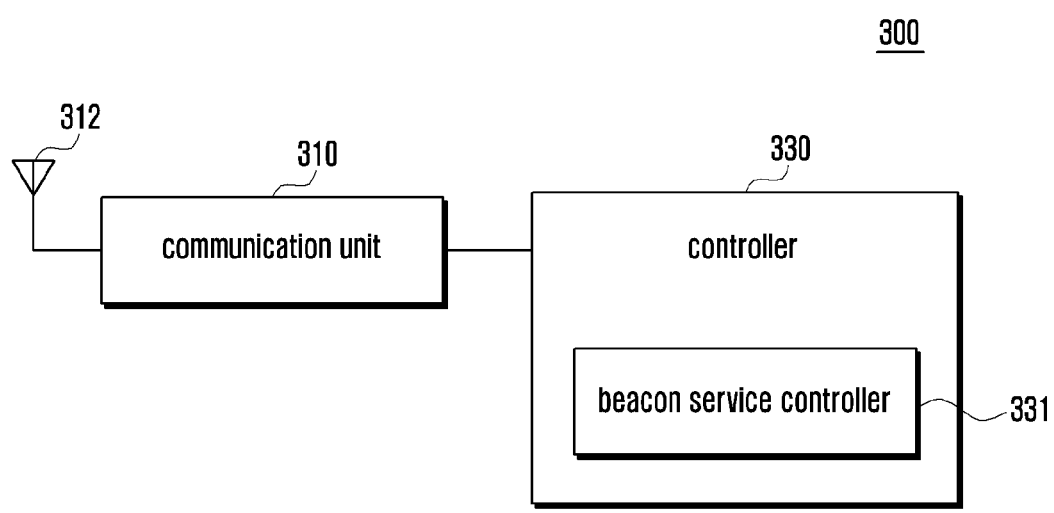
FIG. 3 is a block diagram of a service server according to an embodiment of the present disclosure.

FIG. 3 is a block diagram of a service server 300 according to an embodiment of the present disclosure.

Referring to FIG. 3, the service server 300 may include a communication unit 310, an antenna 312, and a controller 330. The service server 300 may further include a storage unit which stores information for the performance of a beacon service.

The service server 300 may communicate with at least one network node through the communication unit 310. The communication unit 310 may directly communicate with a beacon transmitting device and may receive, from a beacon receiving device, a signal transmitted by a beacon transmitting device.

The controller 330 may control a general operation of the service server 300. The controller 330 according to an embodiment of the present disclosure may include a beacon service controller 331. The beacon service controller 331 may control the service server 300 to provide a beacon service.

According to an embodiment of the present disclosure, the beacon service controller 331 may control the reception of mode information on a beacon service, to generate control information based on mode information, and the transmission of control information to an output device. Mode information may be identified from a beacon signal transmitted by a beacon transmitting device, and a beacon signal may include mode information corresponding to at least one piece of distance information.

The beacon service controller 331 may control the reception of a beacon signal and the identification of mode information from a beacon signal based on distance information between a beacon transmitting device and the service server 300.

The beacon service controller 331 may control the reception of mode information from a beacon receiving device. Mode information may be determined based on distance information between a beacon transmitting device and a beacon receiving device among mode information included in a beacon signal.

Although the service server 300 has been described as including separated blocks, it is only for convenience of description, and the configuration of the service server 300 according to the present disclosure is not limited thereto. For example, the operations, which are performed by the beacon controller 331, may be performed by the controller 330. According to an embodiment of the present disclosure, the operations of the service server 300 are not limited to the operations described in FIG. 3, and the controller 330 of the service server 300 may control the performance of operations of the service server 300 described above and below in FIGS. 1 to 14.

Figure 4:
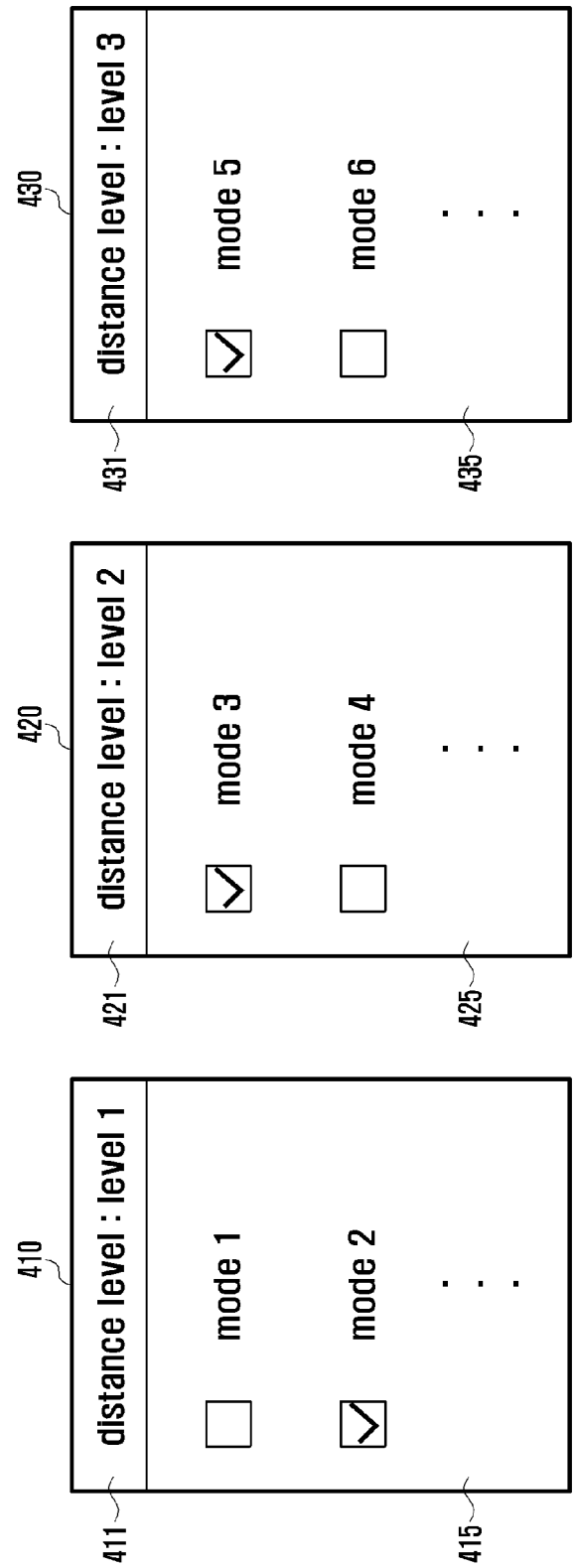
FIG. 4 is a diagram of a beacon-related information configuration method for beacon generation by a beacon transmitting device according to an embodiment of the present disclosure.

FIG. 4 is a diagram of a beacon-related information configuration method for beacon generation by a beacon transmitting device according to an embodiment of the present disclosure. The beacon-related information for generating a beacon signal may be configured through the method described below.

Referring to FIG. 4, beacon configuration areas 410, 420, and 430 may be generated in a beacon transmitting device. The beacon transmitting device may display at least one beacon configuration area 410, 420, 430. The beacon configuration area 410, 420, 430 may include distance level configuration areas 411, 421, and 431, and operation mode configuration areas 415, 425, and 435. The distance level refers to a distance between a beacon transmitting device that transmits a beacon signal and a beacon receiving device that receives the beacon signal. The mode may be information indicating a particular operation or particular level information. The mode may correspond to service identification information or service ID information included in a beacon signal.

The user may configure the distance level and the operation mode by using the beacon configuration area 410, 420, 430. For example, the distance level may be configured as a particular distance. In the distance level, level 1 may be configured as a maximum beacon transmission distance, level 2 may be configured as 10 m, and level 3 may be configured as 1 m. When the distance level is configured as a particular distance, a distance between level 1 and level 2 may be configured as one range, a distance between level 2 and level 3 may be configured as another range, and a distance equal to or smaller than level 3 may be configured as still another range. Further, the distance level may configure a particular range. For example, level 1 may be configured as a range from a maximum transmission distance to 20 m, level 2 may be configured as a range from 10 m to 5 m, and level 3 may be configured as a range equal to or smaller than 1 m.

An operation mode for level 1 may be configured in the operation mode configuration area 415, an operation mode for level 2 may be configured in the operation mode configuration area 425, and an operation mode for level 3 may be configured in the operation mode configuration area 435.

When a distance level is configured in a distance level configuration area 411, 421, 431 of the beacon configuration area 410, 420, 430 and the mode is configured in the operation mode configuration area 415, 425, 435, the operation mode corresponding to each distance level may be determined. Based on the current configuration of FIG. 4, mode 2 is configured in distance level 1, and mode 3 is configured in distance level 2, and mode 5 is configured in distance level 3. According to the configuration, a beacon transmitting device may transmit a beacon signal for the configuration. A beacon signal may include a pair of distance level information and operation mode information corresponding to each piece of distance level information. The operation mode may be marked by service ID information corresponding to the operation mode in the beacon signal and transmitted. A beacon transmitting device, a beacon receiving device, or a service server may store a mapping table of service identification information corresponding to operation mode. Accordingly, a beacon transmitting device may transmit service identification information corresponding to a configured operation mode, and a beacon receiving device or a service server may receive service identification information and identify the operation mode.

According to an embodiment of the present disclosure, the mode according to a distance between a beacon transmitting device and a beacon receiving device is predetermined and transmitted by the beacon transmitting device, and operations of a receiving side may be controlled according to settings of the beacon transmitting device. According to an embodiment of the present disclosure, it is possible to additionally configure various operations according to the distance between a beacon transmitting device and a beacon receiving device through the use of additional configurations.

According to an embodiment of the present disclosure, it is possible to configure different operation modes according to a distance between a beacon transmitting device and a beacon receiving device based on each time zone. For example, an operation mode according to a distance between a beacon transmitting device and a beacon receiving device may be configured between 9 a.m. and 9 p.m. Further, an operation mode according to a distance between a beacon transmitting device and a beacon receiving device may be configured between 9 p.m. and 9 a.m. of the next day. For example, in FIG. 4, a beacon signal configured to perform operations of mode 2, mode 3, and mode 5 according to the distance level is currently transmitted. The above configuration may correspond to the configuration between 9 a.m. and 9 p.m., and operations of mode 1, mode 4, and mode 5 may be configured to be performed according to the distance level between 9 p.m. and 9 a.m. of the next day through an additional configuration. When a beacon transmitting device transmits a beacon signal, the operation mode according to a distance between the beacon transmitting device and a beacon receiving device may be configured, and also an operation according to a time zone may be configured using an additional input.

According to an embodiment of the present disclosure, when an operation mode corresponds to providing information, an amount of information, a type of information, or an information priority may be configured differently according to a distance between a beacon transmitting device and a beacon receiving device. Further, operation modes correspond to cases where a distance between a beacon transmitting device and a beacon receiving device becomes shorter, a distance between a beacon transmitting device and a beacon receiving device becomes longer, and a speed of a beacon transmitting device changes. For an additional configuration, beacon configuration areas 410, 420, and 430 may include additional configuration areas.

Although a configuration method for beacon generation through the bacon configuration area displayed on the display unit of the beacon transmitting device is described for the embodiment of the present disclosure illustrated in FIG. 4, it is only one possible embodiment and the configuration method for the beacon generation is not limited to the input method through the display unit.

Figure 5:
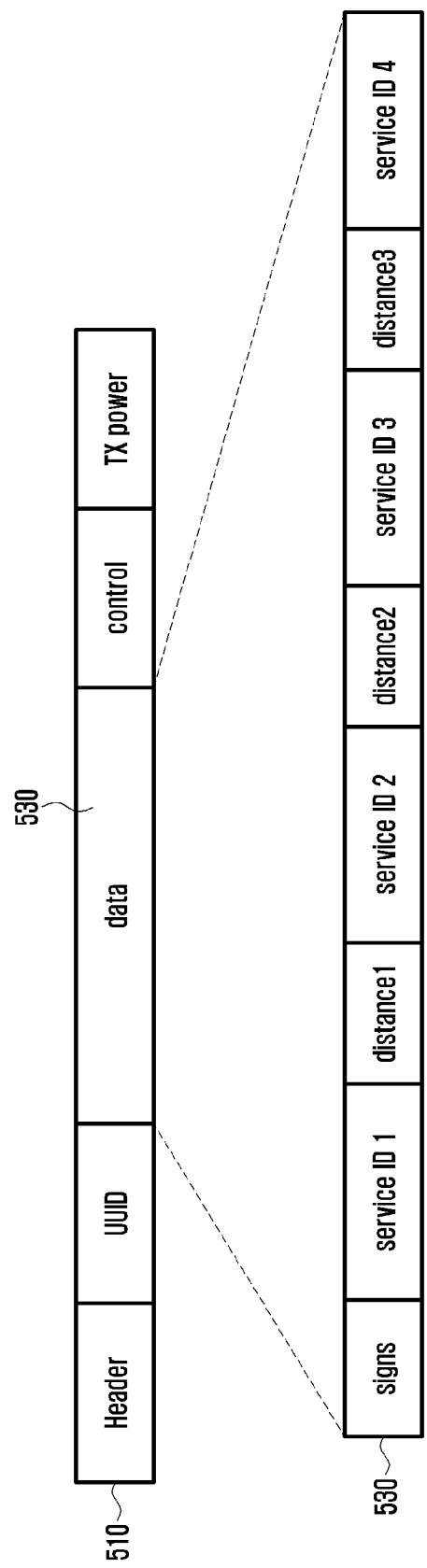
FIG. 5 is a diagram of a beacon signal field according to an embodiment of the present disclosure.

FIG. 5 is a diagram of a beacon signal field according to an embodiment of the present disclosure. The embodiment of FIG. 5 suggests a new signal field configuration method for the beacon signal field transmitted by the beacon transmitting device.

Referring to FIG. 5, a beacon signal field 510 may include a header field, a unique user identifier (UUID) field, a data field 530, a control field, and a transmission power (Tx power) field.

The unique user identifier field may include identification information by which a beacon transmitting device can be identified or identification information on a user using the beacon transmitting device. The data field 530 may include information on beacon-related information configuration matters. The transmission power field may include information indicating transmission power with which a beacon signal is transmitted.

The data field 530 may include beacon-related information configuration matters. The beacon-related information configuration matters are referred to in the description of FIG. 4 above.

For example, the data field 530 may include information on service identification information (service ID). The service identification information may be service identification information configured by the beacon transmitting device to correspond to each distance between a beacon transmitting device and a beacon receiving device. The service identification information may correspond to a method of providing a particular service, a particular operation, and particular information. According to an embodiment of the present disclosure, when information on distance is not included in a beacon signal, if a beacon receiving device or a service server stores a correspondence table of the service identification information corresponding to distance, corresponding service identification information may be identified based on an estimated distance.

The data field 530 may further include distance information (e.g. distance 1, distance 2, and distance 3). The distance information may correspond to the distance level of FIG. 4. When a beacon signal includes distance information, a beacon receiving device or a service server may identify service identification information corresponding to an estimated distance by using only the received beacon signal even though the beacon receiving device or the service server does not store a mapping table including service identification information corresponding to the distance.

The data field 530 may further include sign information. For example, the sign information may include one of the operators such as "=," ">," "<," "≤," and "≥." For example, when it is assumed that the sign is configured as ">," beacon configuration-related information on the data field 530 may be analyzed as follows.

Maximum beacon signal transmission distance>service ID 1>distance 1>service ID 2>distance 2>service ID 3>distance 3>service ID 4

An operation corresponding to service ID 1 may be performed when the distance between the beacon transmitting device and the beacon receiving device is between the maximum transmission distance and distance 1, an operation corresponding to service ID 2 may be performed when the distance between the beacon transmitting device and the beacon receiving device is between distance 1 and distance 2, an operation corresponding to service ID 3 may be performed when the distance between the beacon transmitting device and the beacon receiving device is between distance 2 and distance 3, and an operation corresponding to service ID 4 may be performed when the distance between the beacon transmitting device and the beacon receiving device is within distance 3. That is, as described above, the beacon signal in which operation information corresponding to the distance section is configured may be transmitted using the signs, distance information, and service identification information.

The data field 530 may further include additional information. For example, a case where the distance between the beacon transmitting device and the beacon receiving device becomes shorter, a case where the distance between the beacon transmitting device and the beacon receiving device becomes longer, a case where the speed of the beacon transmitting device changes, and service identification information corresponding to the cases may be applied as additional information.

Meanwhile, the data field may consist of 4 bytes. In the data field, each piece of distance information may be indicated by 4-bit information, and the service identification information may consist of 4-bit information. Further, the sign information may consist of 1-bit information. In addition, a first field of the service identification information may consist of 7 bits. Additional information may be represented by the 7 bits of the first field. When the sign information is represented by 1 bit, for example, ">" and "<" may be represented by 1-bit information. According to an embodiment of the present disclosure, when the beacon signal field of FIG. 5 is configured as described above, the field may include a total of 32 bits.

Meanwhile, the aforementioned configuration of the beacon signal field is only one possible embodiment, and a beacon signal of the present disclosure is not limited thereto.

Figure 6:
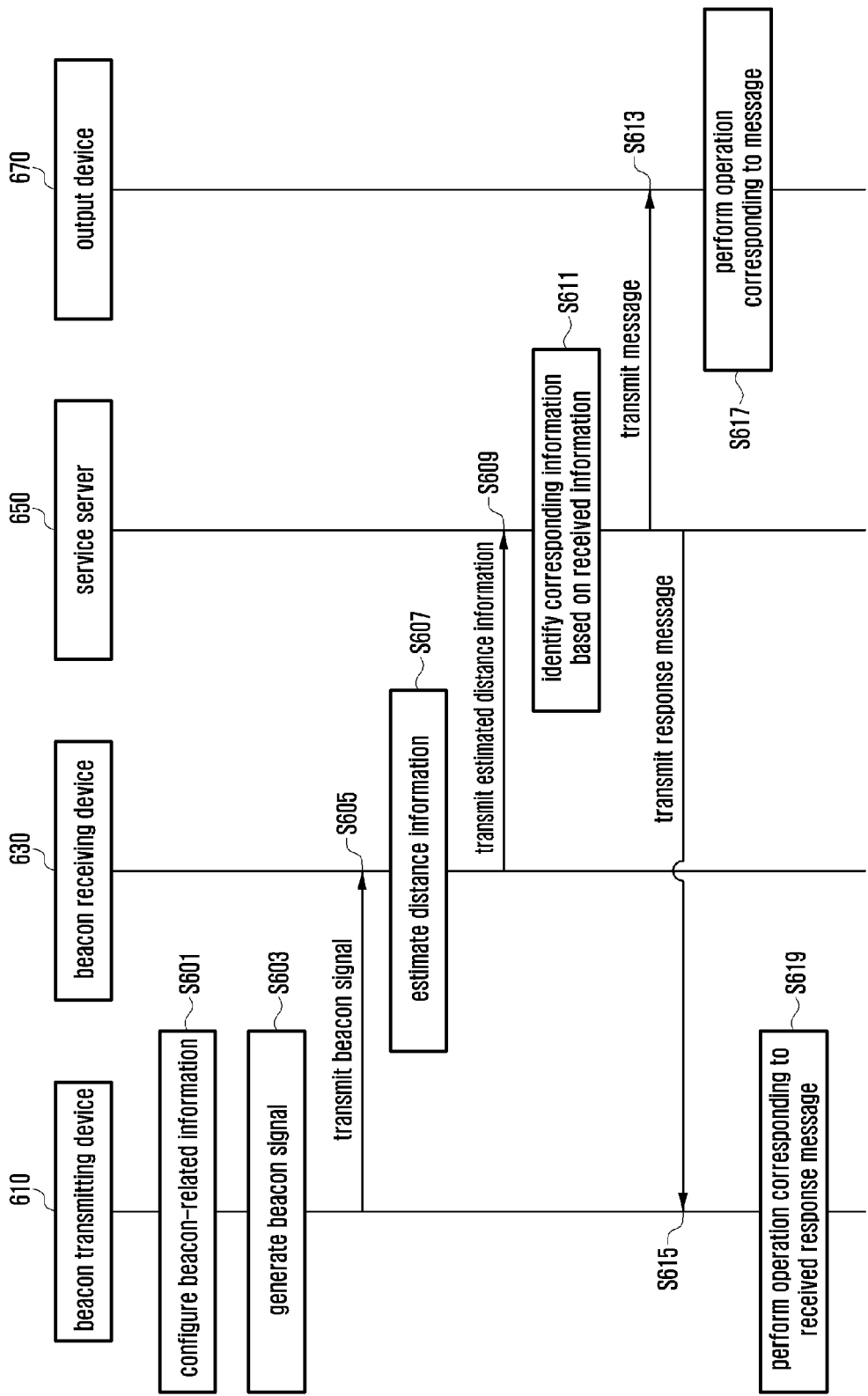
FIG. 6 is a flow diagram of a method of a beacon service system according to an embodiment of the present disclosure.

FIG. 6 is a flow diagram of a method of a beacon service system according to an embodiment of the present disclosure.

Referring to FIG. 6, the beacon service system may include a beacon transmitting device 610, a beacon receiving device 630, a service server 650, and an output device 670. As illustrated in FIG. 1, some entities can be omitted and some entities may be included in other entities. The description of FIG. 1 above may be referred to for a description of a general function and operation of each entity.

The beacon transmitting device 610 may configure beacon-related information in step S601. A method of configuring the beacon-related information may use the method described above with reference to FIG. 4. When the user does not configure the beacon-related information, a default configuration may be used.

The beacon transmitting device 610 may generate a beacon signal based on the beacon-related information in step S603. The beacon signal may include service identification information corresponding to distance information. For example, the beacon signal may include the beacon signal field as described above with reference to FIG. 5. Further, the data field of the beacon signal field may include the content of the beacon-related information configured by the beacon transmitting device 610.

The beacon transmitting device 610 may transmit the beacon signal in step S605. A unicast method, a multicast method, or a broadcast method may be selected as the signal transmitting method. The beacon receiving device 630 may receive the beacon signal. When the beacon receiving device 630 is included in the service server 650, the service server 650 may receive the beacon signal.

The beacon receiving device 630 may estimate a distance between the beacon transmitting device 610 that transmitted the beacon signal and the beacon receiving device 630 that received the beacon signal based on the received beacon signal in step S607. The beacon receiving device 630 may transmit the estimated distance information to the service server 650 in step S609. After estimating the distance based on the received beacon signal in step 607, the beacon receiving device 630 may transmit service identification information corresponding to the estimated distance information to the service server 650. That is, after estimating the distance, the beacon receiving device 650 may extract service identification information corresponding to the distance included in the beacon signal and transmit the extracted service identification information to the service server 650 in step S609. The beacon receiving device 630 may also transmit UUID information extracted from the received beacon signal to the service server 650.

The beacon receiving device 630 may transmit a signal to the service server 650 by using the UUID of the beacon transmitting device 610 and distance information. In this case, the signal may be a web Uniform Resource Identifier (URI).

For example, the beacon receiving device 630 may transmit the web URI to the service server 650 in Table 1 below.

TABLE 1

| protocol://{address information}/server information/data information |
|---|
| http://{ipaddress}     /     TommyHome     /     12c1776b-e08e-4fe7-b99a-18e6da33b4b8xxxx |

When the beacon receiving device 630 and the service server 650 are the same device, address information and server information are fixed. In this case, data information may vary depending on the beacon signal received by the beacon receiving device 630. For example, the data information may vary depending on the UUID of the beacon signal and distance information between the beacon transmitting device 610 and the beacon receiving device 630.

In the data information, a part marked by "[xxxx]" may be used as a parameter indicating distance information. "[xxxx]" may indicate distance information or service identification information corresponding to the distance between the beacon transmitting device 610 and the beacon receiving device 630 among the service identification information (service ID) included in the beacon signal. Accordingly, different pieces of service identification information may be transmitted to the service server 650 according to the distance between the beacon transmitting device 610 and the beacon receiving device 630.

In addition, the beacon receiving device 630 may transfer the received beacon signal to the service server 650 without estimating the distance. In this case, the service server 650 may identify the distance by analyzing the received beacon signal and extract service identification information corresponding to the distance identification.

In step S611, the service server 650 may identify corresponding service information based on the information received in step S609. For example, when the beacon receiving device 630 transmits the distance information, the service server 650 may extract service identification information corresponding to the distance information and identify service information corresponding to the extracted service identification information. For example, when the beacon receiving device 630 directly transmits the beacon signal, the service server 650 may estimate the distance and extract service identification information corresponding to the estimated distance. For example, when the beacon receiving device 630 transmits service identification information corresponding to the distance information, the service server 650 may identify service information corresponding to the service identification information. The service server 650 may make a request for information corresponding to the service identification information to a higher server or a web address when needed.

When the identified service information is implemented through the output device 670, the service server 650 may transmit a message for executing the identified service information to the output device in step S613. The output device 670 having received the message may perform an operation corresponding to the received message. In this case, when the beacon transmitting device 610 transmits the beacon signal, the output device 670 may perform an operation corresponding to the service identification information configured according to the distance between the beacon transmitting device 610 and the beacon receiving device 630.

The service server 650 may transmit a response message to the beacon transmitting device 610 in step S615. The response message may be a message for implementing the identified service information in the beacon transmitting device 610. The beacon transmitting device 610 having received the response message may perform an operation corresponding to the received response message. In this case, when the beacon transmitting device 610 transmits the beacon signal, the beacon transmitting device 610 may perform an operation corresponding to the service identification information configured according to the distance between the beacon transmitting device 610 and the beacon receiving device 630.

According to an embodiment of the present disclosure, the following method may be used as a method of estimating or measuring the distance between the beacon transmitting device 610 and the beacon receiving device 630. First, the distance may be estimated based on the RSSI on the beacon signal received by the beacon receiving device 630. When the distance is estimated using the RSSI, the distance may be estimated using transmission power (Tx power) included in the beacon signal field and the RSSI.

The beacon transmitting device 610 inputs radiation power of the transmitter into a transmission power field of the beacon signal. For example, the radiation power may be input with a signal strength in a dB form (condition 1). The beacon transmitting device may calculate maximum distance information which can be radiated according to each dB size and input a distance value (condition 2).

The beacon receiving device 630 may detect the signal strength of the beacon transmitting device 610 and read a transmission power field value of the beacon signal transmitted by the beacon transmitting device 610. When the beacon transmitting device 610 configures the transmission power field through a method of condition 1 and transmits the beacon signal, the beacon receiving device 630 may pre-store actual distance information between the beacon transmitting device 610 and the beacon receiving device 630 according to a reception sensitivity for each transmitted signal strength of the beacon transmitting device 610 and estimate the actual distance by using the stored information. The stored information may be table information. The beacon receiving device 630 may estimate the actual distance between the beacon receiving device 630 and the beacon transmitting device 610 by using the transmission power field of the beacon signal, the reception sensitivity of the beacon signal, and the stored information.

When the beacon signal is transmitted through a method of condition 2, the beacon receiving device 630 may store actual distance information for each reception sensitivity with respect to the distance information input by the beacon transmitting device 610. The beacon receiving device 630 may extract distance information from the beacon signal field of the received signal and estimate the actual distance between the beacon transmitting device 610 and the beacon receiving device 630 by using information of the reception sensitivity of the beacon signal and the stored information.

Next, a method of calculating the distance between the beacon transmitting device 610 and the beacon receiving device 630 by using a GPS is described below. First, a method of using GPS information of the reception device in a state where a location of the beacon transmitting device 610 is preset is described below. The beacon transmitting device 610 may transmit the beacon signal in a fixed location. It is assumed that the beacon receiving device 630 moves. It is assumed that, when the beacon transmitting device 610 transmits the is beacon signal, the beacon transmitting device 610 also transmits GPS information concerning the beacon transmitting device 610. The beacon receiving device 630 which received the beacon signal may calculate the distance by using the GPS information concerning the beacon transmitting device 610 and the GPS information concerning the beacon receiving device 630.

The beacon transmitting device 610 may indicate whether a location of the beacon transmitting device 610 is preset or not by using one of the beacon signal transmission fields. The function may be activated from the moment the beacon receiving device 630 first receives the signal from the beacon transmitting device 610. The beacon receiving device 630 may acquire, from the signal of the beacon transmitting device 610, information of the field indicating whether the location of the beacon transmitting device 610 is preset or not. When location information (for example, GPS) on the beacon transmitting device 610 is provided, the provided information may be used. When the location of the beacon transmitting device 610 is preset but the information is not provided, the beacon receiving device 630 may make a request for location information on the beacon transmitting device 610 to a particular URI or a location of a cloud server. The beacon receiving device 630 may measure the distance from the beacon transmitting device 610 by using the requested location information on the beacon transmitting device 610.

For example, the beacon receiving device 630 may know in advance a path along which the location information concerning the beacon transmitting device 610 is stored. The function may be activated from the moment the beacon receiving device 630 first receives the signal from the beacon transmitting device 610. The beacon receiving device 630 may make a request for location information concerning the beacon transmitting device 610 to the path along which the location information concerning the beacon transmitting device 610 which is known in advance is stored. The beacon receiving device 630 may measure the distance from the beacon transmitting device 610 by using location information concerning the beacon transmitting device 610, after having made the request.

There is also a method of configuring a location of the beacon receiving device 630 in advance and using GPS information concerning the beacon transmitting device 610. It is assumed that the beacon transmitting device 610 can move and the beacon receiving device 630 is fixed to a particular location.

The transmission device may insert location information on the beacon transmitting device 610 (for example, GPS) into the beacon signal field. The beacon receiving device 630 may start the function after receiving a signal transmitted from the beacon transmitting device 610. The beacon receiving device 630 may acquire location information concerning the beacon transmitting device 610 from the signal of the beacon transmitting device 610. The beacon receiving device 630 may measure a distance between the beacon transmitting device 610 and the beacon receiving device 630 by using the location information concerning the beacon receiving device 630.

The beacon transmitting device 610 may allocate one of the transmission signal fields to indicate whether the location of the beacon transmitting device 610 is preset or not. When the beacon receiving device 630 receives the signal from the beacon transmitting device 610, the function may start. The beacon receiving device 630 may acquire, from the signal of the beacon transmitting device 610, information of the field indicating whether the location of the beacon transmitting device 610 is preset or not. For example, when the beacon transmitting device 610 provides location information (for example, GPS), the provided information is used. When the beacon transmitting device 610 does not provide the location information although it is identified that the location of the beacon transmitting device 610 is preset, the beacon receiving device 630 makes a request for the location information concerning the beacon transmitting device 610 to a predefined URI or a location of a particular cloud server. The beacon receiving device 630 may measure the distance from the beacon transmitting device 610 using the requested location information.

The beacon receiving device 630 may know in advance a path along which the location information concerning the beacon transmitting device 610 is stored. The function may be initiated from the moment the beacon receiving device 630 first receives the signal from the beacon transmitting device 610. The beacon receiving device 630 may make a request for the location information concerning the beacon transmitting device 610 to the path along which the location information concerning the beacon transmitting device 610 which is known in advance is stored. The beacon receiving device 630 may measure the distance from the beacon transmitting device 610 by using the requested location information concerning the beacon transmitting device 610.

Additionally, a method of measuring locations of the beacon transmitting device 610 and the beacon receiving device 630 may include a method of measuring an indoor location by using the Institute of Electrical and Electronics Engineers (IEEE) wireless networking standard 802.11 ac, and a method of measuring a location by using a micro-electro-mechanical system (MEMS) sensor.

Hereinafter, the present disclosure is described through detailed embodiments of the present disclosure.

An embodiment of the present disclosure describes a case where the present disclosure is used for a street mall.

Figure 7:
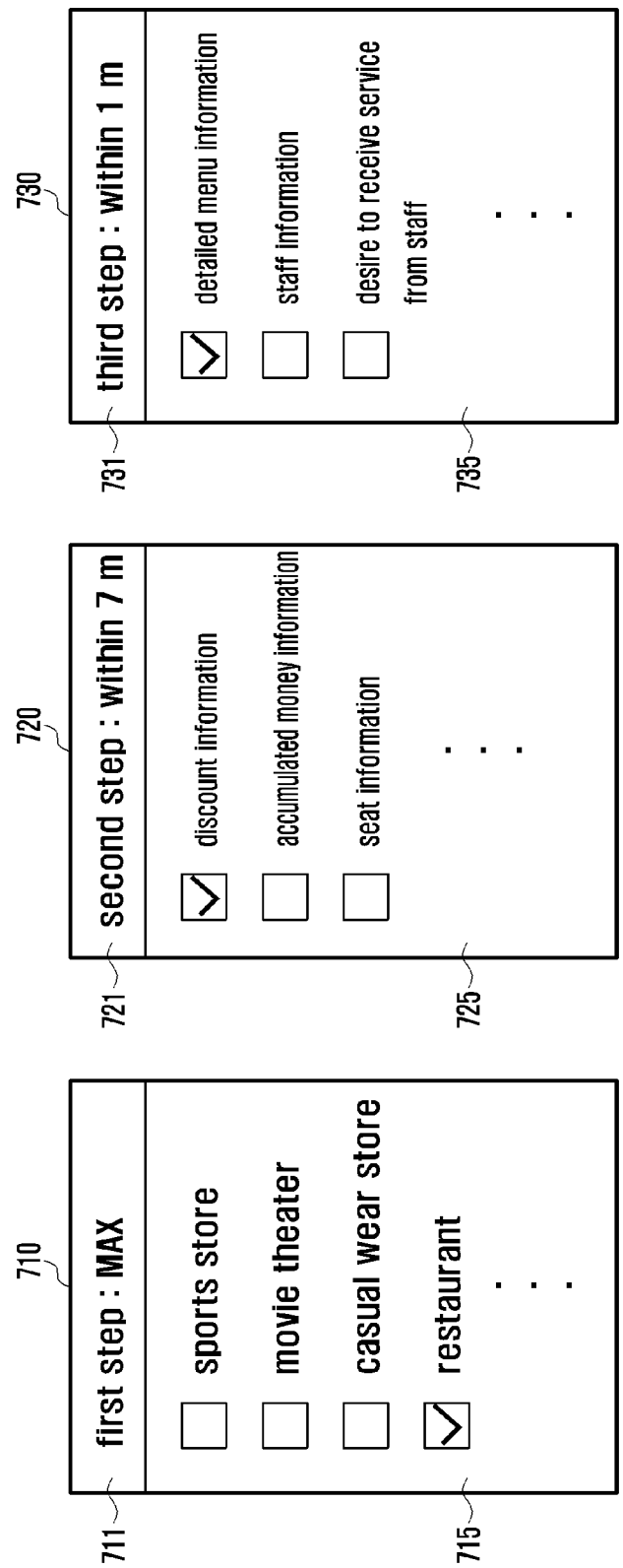
FIG. 7 is a diagram of a beacon-related information configuration method for beacon generation according to an embodiment of the present disclosure.
Figure 8:
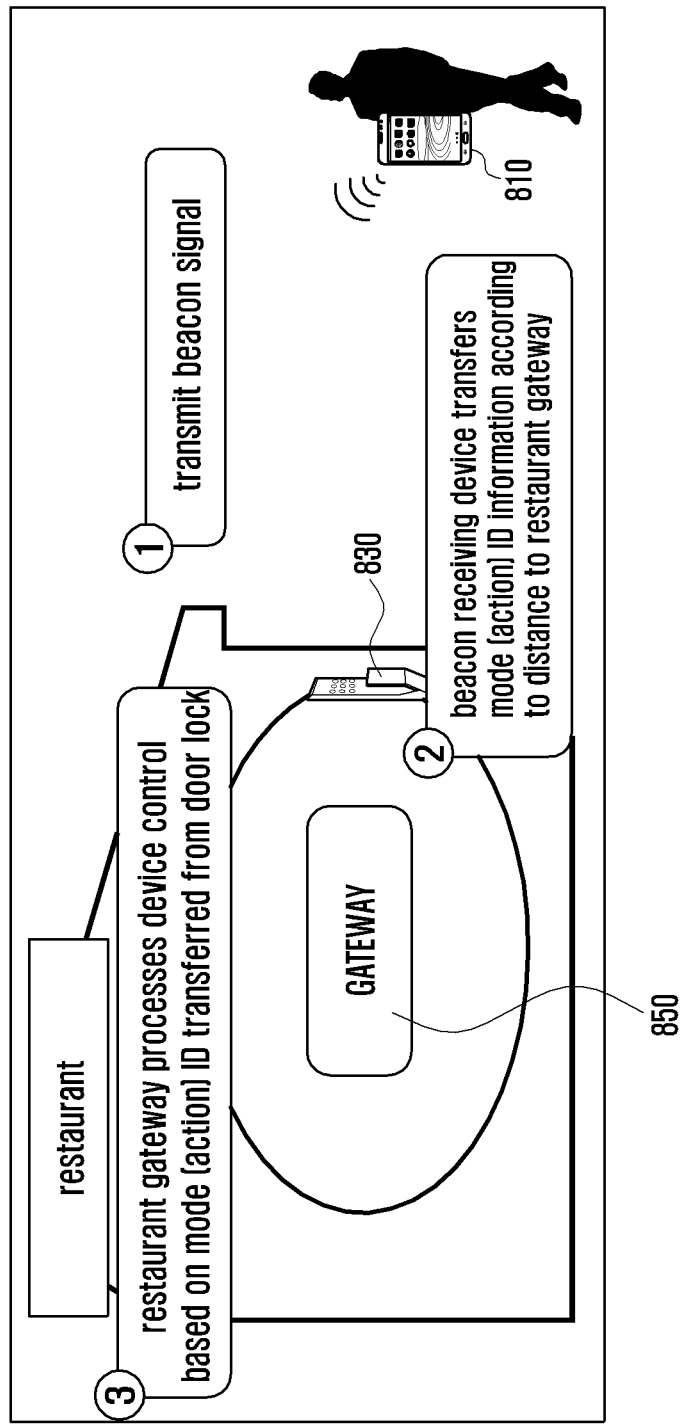
FIG. 8 is a diagram of a scenario according to an embodiment of the present disclosure.
Figure 9:
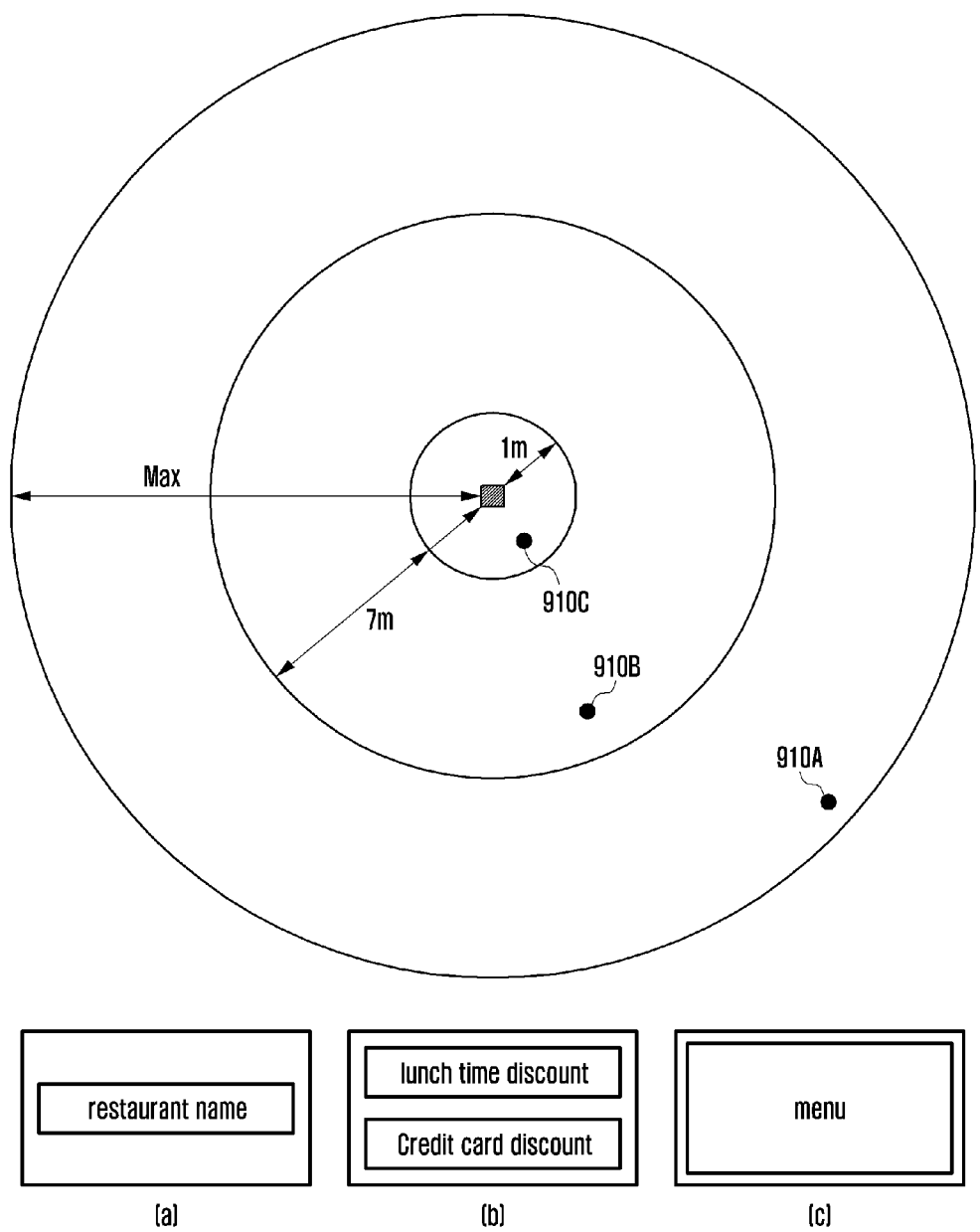
FIG. 9 is a diagram of content of a service according to a distance between a beacon transmitting device and a beacon receiving device according to an embodiment of the present disclosure.

FIG. 7 is a diagram of a beacon-related information configuration method for beacon generation according to an embodiment of the present disclosure, FIG. 8 is a diagram of a scenario according to an embodiment of the present disclosure, and FIG. 9 is a diagram of content of a service according to a distance between a beacon transmitting device and a beacon receiving device according to an embodiment of the present disclosure.

Referring to FIG. 7, distance levels 711, 721, and 731 and operation modes 715, 725, and 735 are configured in beacon configuration areas 710, 720, and 730. A detailed description of the beacon-related configuration information is provided above with reference to FIG. 4.

In FIG. 7, output information is configured according to the distance between a beacon transmitting device and a beacon receiving device. Restaurant information is output between a maximum beacon transmission distance and 7 m, restaurant discount information is output between 7 m and 1 m, and detailed menu information is output within 1 m. The beacon transmitting device may generate a beacon signal based on operation mode information corresponding to the above distance information and transmit the generated beacon signal.

Referring to FIG. 8, a beacon transmitting device 810 may be a terminal, a beacon receiving device 830 may be a door lock, and a service server 850 may be a restaurant gateway. The beacon transmitting device 810 may transmit a beacon signal based on the beacon-related configuration information of FIG. 7. The beacon receiving device 830 may receive the beacon signal.

The beacon receiving device 830 may transmit the received beacon signal or information extracted from the beacon signal to the service server 850. A detailed description of the operation is provided above with reference to FIG. 6.

The service server 850 may control the performance of an operation configured according to the distance between the beacon transmitting device 810 and the beacon receiving device 830 based on information received from the beacon receiving device 830.

Referring to FIG. 9, it is noted that different output results may be produced according to a relative location of a beacon transmitting device with respect to a beacon receiving device. The beacon transmitting device may be positioned within 1 m from the beacon receiving device, between 1 m and 7 m, or between 7 m and a maximum beacon transmission distance.

When the location of the beacon transmitting device corresponds to a point 910a, the beacon transmitting device and the beacon receiving device are positioned between 7 m and the maximum beacon transmission distance. According to the beacon-related configuration of FIG. 7, in this case the restaurant information may be output. Accordingly, the service server may control the outputting of restaurant information on a restaurant positioned within the corresponding distance. The restaurant information may be various pieces of information according to a user's setting such as a store name, a type of the restaurant, and location information on the restaurant (e.g. output means (a)).

When the location of the beacon transmitting device corresponds to a point 910b, the beacon transmitting device and the beacon receiving device are positioned between 1 m and 7 m. According to the beacon-related configuration of FIG. 7, in this case the restaurant discount information may be output. Accordingly, the service server may control the outputting of restaurant discount information on restaurants positioned within the corresponding distance in the form of output means (b).

When the location of the beacon transmitting device corresponds to a point 910c, the beacon transmitting device and the beacon receiving device are positioned within 1 m. According to the beacon-related configuration of FIG. 7, in this case the restaurant menu information may be output. Accordingly, the service server may control the outputting of restaurant menu information on restaurants positioned within the corresponding distance in the form of output means (c).

In the above description, output means such as (a), (b), and (c) may vary. For example, each restaurant may have a display device connected to the service server. The service server may control the outputting of output means (a), (b), and (c) information according to the distance between the beacon transmitting device and the beacon receiving device through the display device of the restaurant. Further, the output means may be the beacon transmitting device. In this case, the service server may transfer, to the beacon transmitting device, the information (a), (b), and (c) to be output, and the beacon transmitting device having received the information may output the corresponding information. Further, the service server may make a control to output information (a) through a common display device when the beacon transmitting device is positioned at the location 910a in the street mall, and to output information (b) and (c) through a display device of a particular restaurant when the beacon transmitting device is positioned at the locations 910b and 910c in which the particular restaurant is selected.

According to an embodiment of the present disclosure, for example, since the user terminal does not receive information which is not selected according to a beacon signal transmitted to a restaurant, the mobile terminal transmits a beacon signal according to configured information, and the terminal may display or receive only the preconfigured information according to locations of the terminal and the beacon receiving device, the efficient use of user-oriented information is possible.

An embodiment of the present disclosure concerns diversifying information according to a distance increase/decrease direction between the beacon transmitting device and the beacon receiving device.

In order to diversify information according to the distance increase/decrease direction, when the beacon-related information is configured, an increase/decrease in the distance between the beacon transmitting device and the beacon receiving device may be additionally configured. For example, the operation mode corresponding to each piece of distance information may be configured when the distance increases or decreases.

Figure 10:
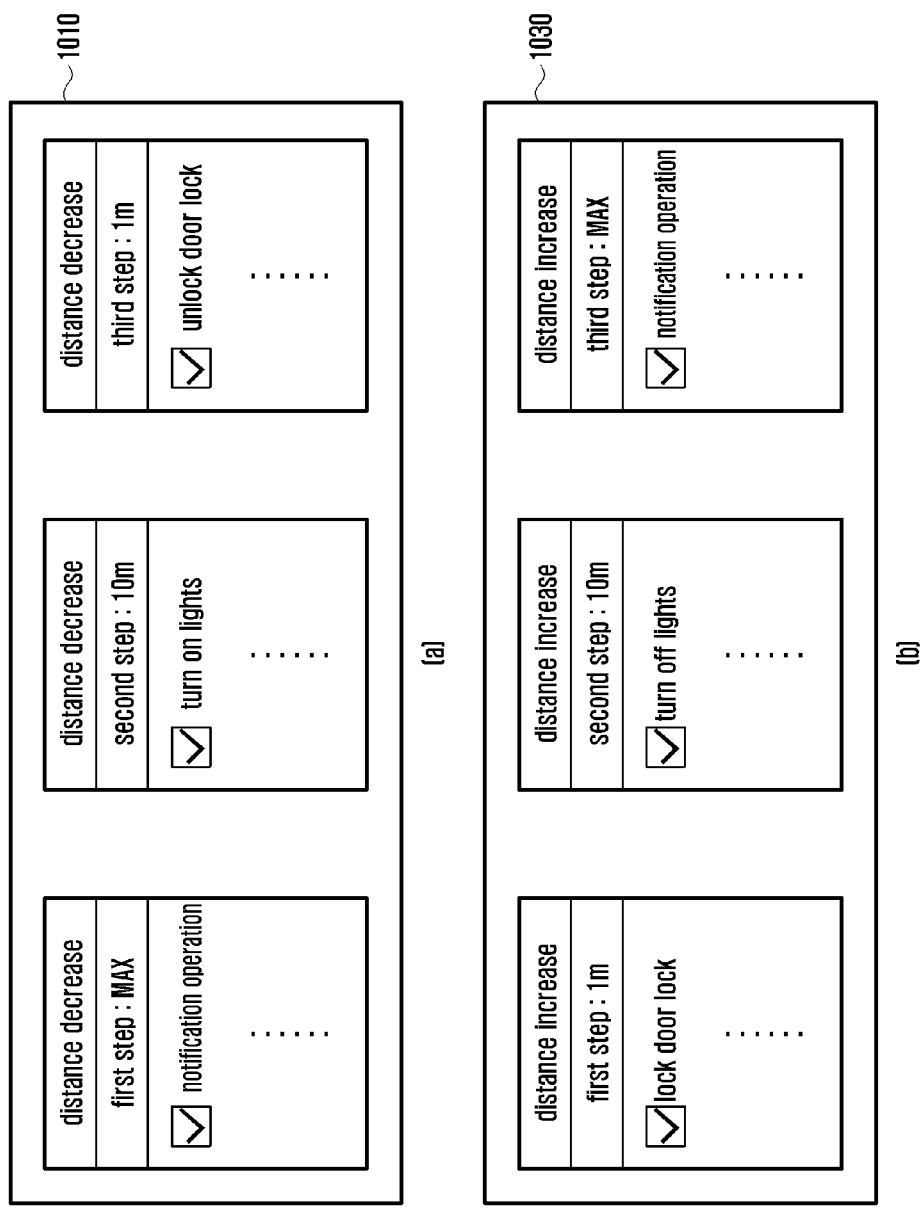
FIG. 10 is a diagram of a beacon-related information configuration method for beacon generation according to an embodiment of the present disclosure.
Figure 11:
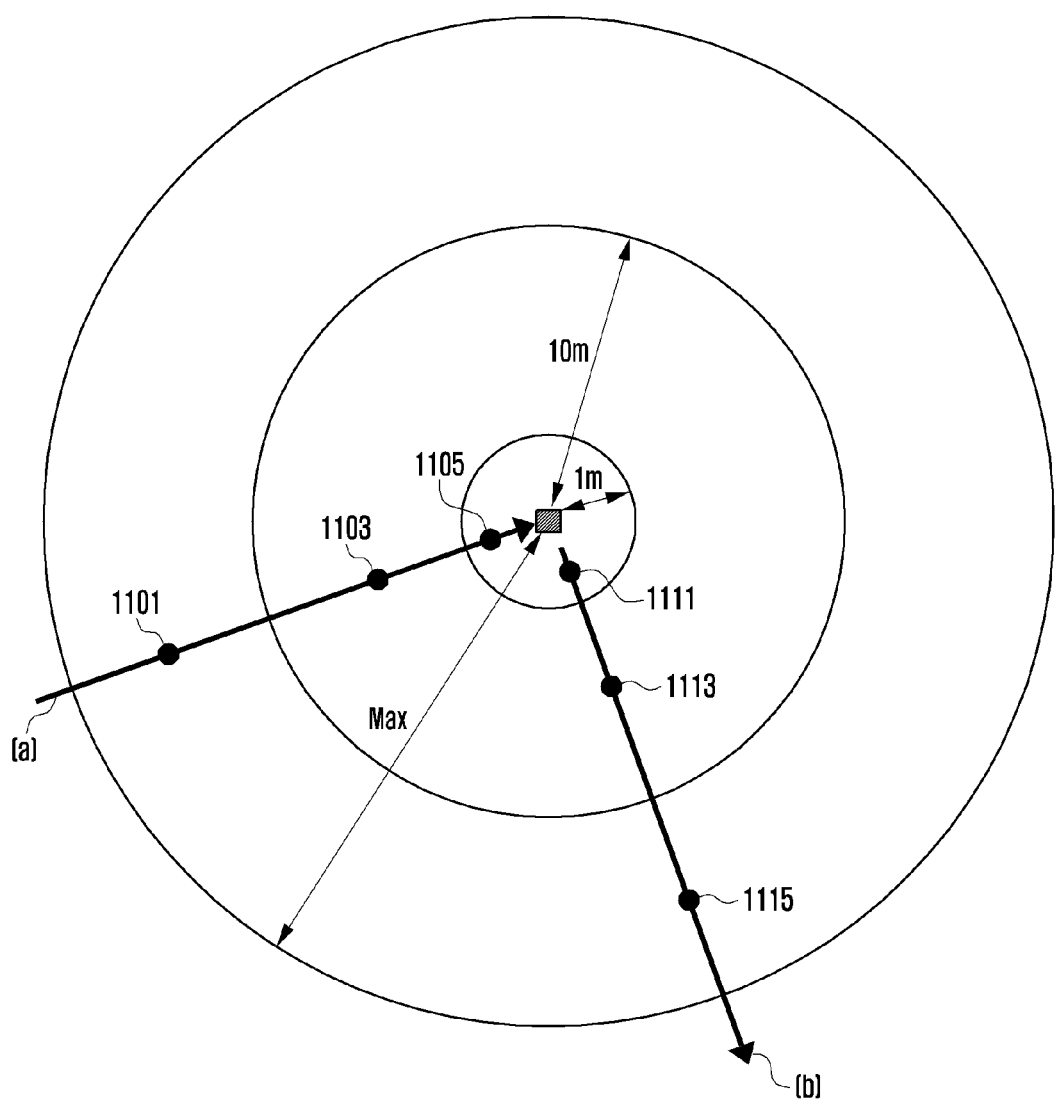
FIG. 11 is a diagram of a scenario according to an embodiment of the present disclosure.

FIG. 10 is a diagram of a beacon-related information configuration method for beacon generation according to an embodiment of the present disclosure, and FIG. 11 is a diagram of a scenario according to an embodiment of the present disclosure.

Referring to FIG. 10, beacon-related configuration information 1010 when the distance between the beacon transmitting device and the beacon receiving device decreases and beacon-related configuration information 1030 when the distance increases are displayed. The beacon-related configuration information additionally includes a parameter indicating whether the beacon-related configuration information is configuration information when the distance increases or decreases according to the embodiment of the present disclosure described above with reference to FIG. 4. However, there are various methods of expressing the parameter indicating the distance increase or the distance decrease according to an embodiment of the present disclosure. The beacon transmitting device may transmit the beacon signal according to the beacon-related configuration information. Further, the beacon transmitting device can move while transmitting the beacon signal.

In the configuration condition of FIG. 10, the beacon receiving device is a door lock and a scenario of a smart home system of the house having the door lock installed therein is assumed.

Referring to the beacon-related configuration information 1010 of FIG. 10 and FIG. 11, the distance between the beacon transmitting device and the beacon receiving device becomes short as the steps are progressed in an order of first step->second step->third step. It is analyzed that the beacon transmitting device moves like (a) of FIG. 11.

In the beacon-related configuration information 1010 of FIG. 10, the first step may correspond to a location 1101 of FIG. 11, the second step may correspond to a location 1103 of FIG. 11, and the third step may correspond to a location 1105 of FIG. 11. In this case, it may be analyzed that a distance between the user carrying the beacon transmitting device and the house becomes shorter. When the first step is switched to the second step or the second step is switched to the third step, the beacon receiving device or the service server may determine the switching as a coming home mode and perform a configured operation. Further, the beacon receiving device or the service server may determine whether the distance becomes shorter or longer by tracking a change in the distance in real time or during a preset period, and perform an operation corresponding to the determination.

When the distance between the beacon transmitting device and the beacon receiving device is between the maximum beacon transmission distance and 10 m, the operation mode may be configured to output a notification operation. For example, the notification operation may be an operation for informing that the user currently carrying the beacon transmitting device comes closer to the house. The notification may be transferred to a user preset to receive the notification through the service server connected to the beacon receiving device. Service operations, which can be configured, may be more various.

When the distance between the beacon transmitting device and the beacon receiving device is between 10 m and 1 m, the operation mode may be configured to turn on lights. Since the user outside comes closer to a door lock installed in the house, the coming home mode may be recognized. The service server connected to the beacon receiving device may control the turning on of the configured lights. Various services may be configured in other coming home modes. For example, there may be an operation for automatically turning on home appliances.

When the distance between the beacon transmitting device and the beacon receiving device is within 1 m, the operation mode may be configured to unlock the door lock. When the user who is outside of the house approaches the door lock of the house and is within 1 m of the door lock, the service server connected to the beacon receiving device may control the automatically unlocking of the door lock according to the configured operation mode. Other service operations may be configured.

Referring to the beacon-related configuration information 1030 of FIG. 10, the distance between the beacon transmitting device and the beacon receiving device becomes long as the steps are progressed in an order of first step->second step->third step. It is analyzed that the beacon transmitting device moves like (b) of FIG. 11. In the beacon-related configuration information 1030 of FIG. 10, the first step may correspond to movement from a location 1111 to a location 1113, the second step may correspond to movement from the location 1113 to a location 1115, and the third step may correspond to movement from the location 1115 to a location beyond the maximum transmission distance. In this case, it may be analyzed that a distance between the user carrying the beacon transmitting device and the house becomes longer. When the first step is switched to the second step or the second step is switched to the third step, the beacon receiving device or the service server may determine the switching as a going out mode and perform a configured operation. Further, the beacon receiving device or the service server may determine whether the distance becomes shorter or longer by tracking a change in the distance in real time or during a preset period, and perform an operation corresponding to the determination.

When the distance between the beacon transmitting device and the beacon receiving device goes beyond 1 m, the operation mode may be configured to change a state of the door lock into a locked state. When the distance between the beacon transmitting device and the beacon receiving device goes beyond 10 m, it may be determined that the user is moving away from the house. Further, it is determined as the going out mode and the configured operation may be performed. According to the embodiment of FIG. 10, the lights may be controlled to be turned off. When the distance between the beacon transmitting device and the beacon receiving device goes beyond the maximum beacon transmission distance, a notification operation may be performed.

A difference between a third embodiment and the previous embodiments is that, when the beacon-related configuration information is configured, a parameter about information on a change in the distance between the beacon transmitting device and the beacon receiving device may be added and the beacon transmitting device transmits a beacon signal including the parameter in the third embodiment. When the additional parameter is used, there is an advantage of configuring different operation modes according to a characteristic of a change in the location of the beacon transmitting device although the distance between the beacon transmitting device and the beacon receiving device is constant. Further, through the parameter, a specialized beacon service for the mobile beacon transmitting device can be provided.

As described above with reference to FIG. 1, the beacon transmitting device may include various mobile electronic devices and a wearable device as well as a general terminal.

An embodiment of the present disclosure corresponds to an operation when the beacon transmitting device transmits a beacon signal in a fixed location and the beacon receiving device moves.

Figure 12:
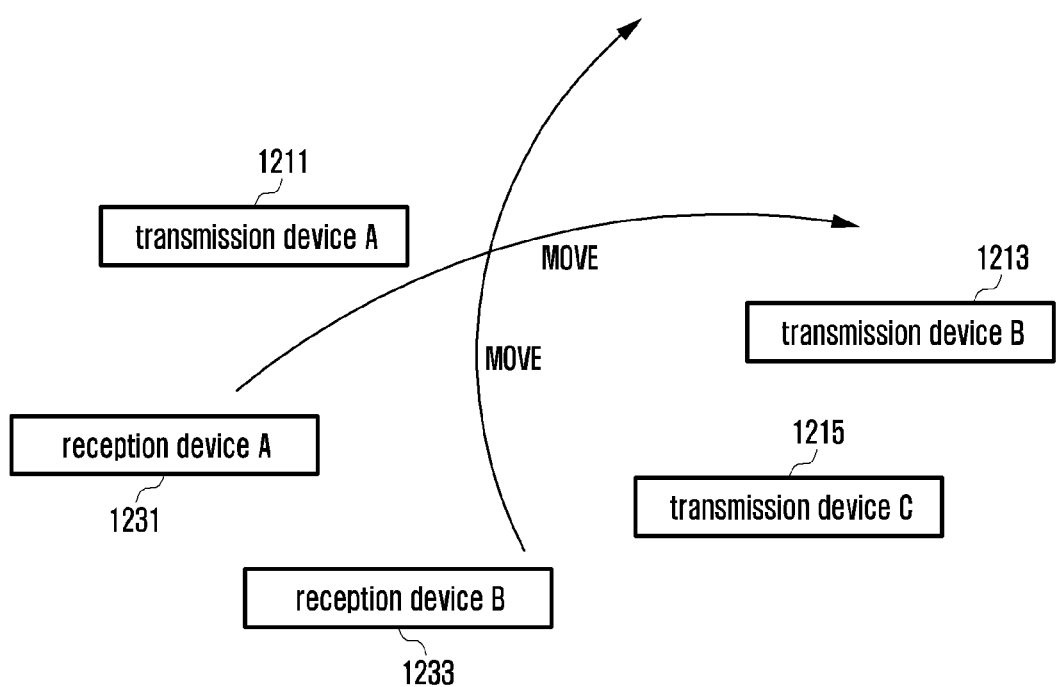
FIG. 12 is a diagram of a beacon service system according to an embodiment of the present disclosure.

FIG. 12 illustrates a beacon service system according to an embodiment of the present disclosure.

Referring to FIG. 12, a transmission device A 1211, a transmission device B 1213, and a transmission device C 1215 may be positioned at fixed locations.

A reception device A 1231 and a reception device B 1233 can move. Since the reception device A 1231 and the reception device B 1233 are mobile, the transmission devices 1211, 1213, and 1215 must transmit a beacon signal considering that the reception device are mobile.

The transmission devices 1211, 1213, and 1215 may configure service modes corresponding to the distance between the transmission devices 1211, 1213, and 1215 and the reception devices 1231 and 1233 as described above with reference to FIG. 4. For example, the service modes may be configured to provide detailed information when the distance is short and to provide only brief headline information when the distance is long. When the fixed transmission devices 1211, 1213, and 1215 transmit beacon signals, the transmission devices 1211, 1213, and 1215 may determine the operation mode corresponding to the distance from the beacon receiving devices 1231 and 1233 and transmit the beacon signal. It is assumed in an embodiment of the present disclosure that the operation mode is configured to output detailed information when the distance is within a first distance range of a transmission device 1211, 1213, and 1215, the operation mode is configured to output headline information when the distance is between the first distance range and a second distance range, and the operation mode is configured to not provide information when the distance is beyond the second distance range.

Figure 13:
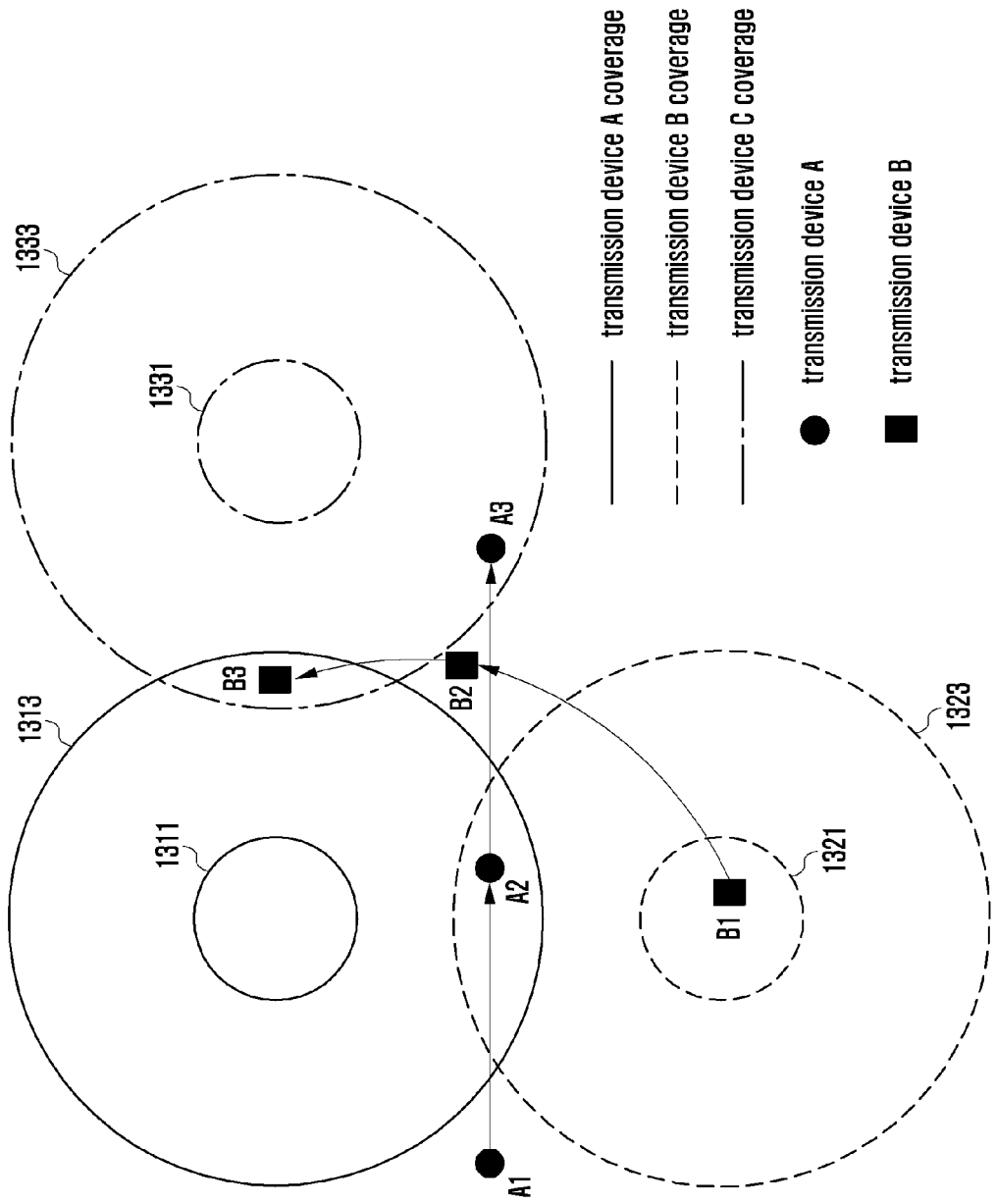
FIG. 13 is a diagram of a location relation between a beacon transmitting device and a beacon receiving device according to an embodiment of the present disclosure.

FIG. 13 is a diagram of a location relation between a beacon transmitting device and a beacon receiving device according to an embodiment of the present disclosure, and FIG. 14 is a block diagram of an operation mode according to a location relation between a beacon transmitting device and a beacon receiving device of FIG. 13 according to an embodiment of the present disclosure.

Referring to FIGS. 13 and 14, reference numeral 1311 corresponds to a range for comparing a first distance from a transmission device A, and reference numeral 1313 corresponds to a range for comparing a second distance from the transmission device A. Similarly, reference numeral 1321 corresponds to a range for comparing a first distance from a transmission device B, and reference numeral 1323 corresponds to a range for comparing a second distance from the transmission device B. Further, reference numeral 1331 corresponds to a range for comparing a first distance from a transmission device C, and reference numeral 1333 corresponds to a range for comparing a second distance from the transmission device C.

A reception device A can move along A1->A2->A3. A reception device B can move along B1->B2->B3. When each reception device moves, a distance between each transmission device and each reception device may become longer or shorter. Since the distance between the transmission device and the reception device changes, information displayed in the reception device may also change.

Figure 14A:
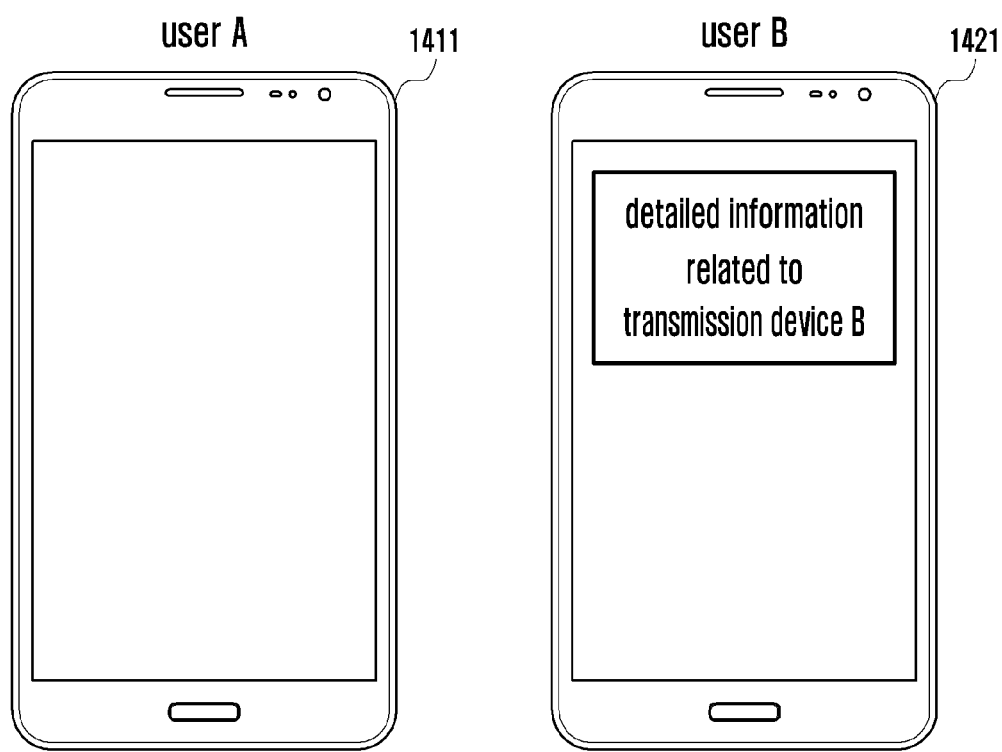
FIGS. 14A to 14C are screen views of operation modes according to a location relations between beacon transmitting devices and beacon receiving devices according to an embodiment of the present disclosure.
Figure 14B:
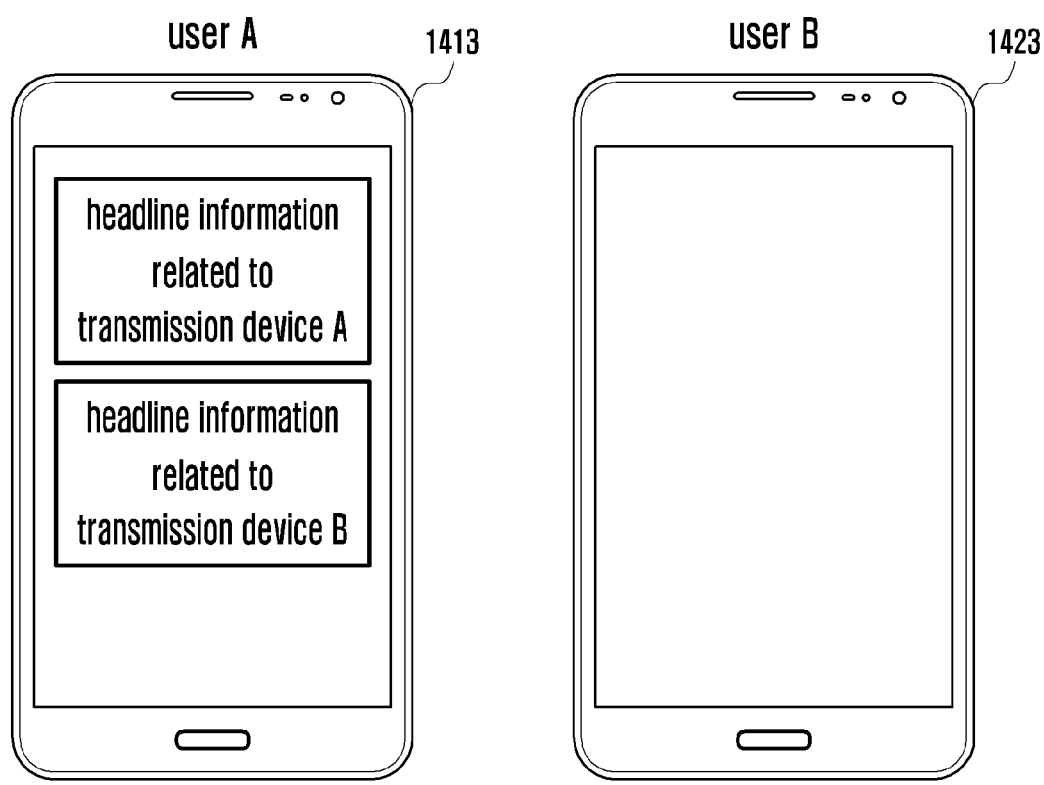
Figure 14C:
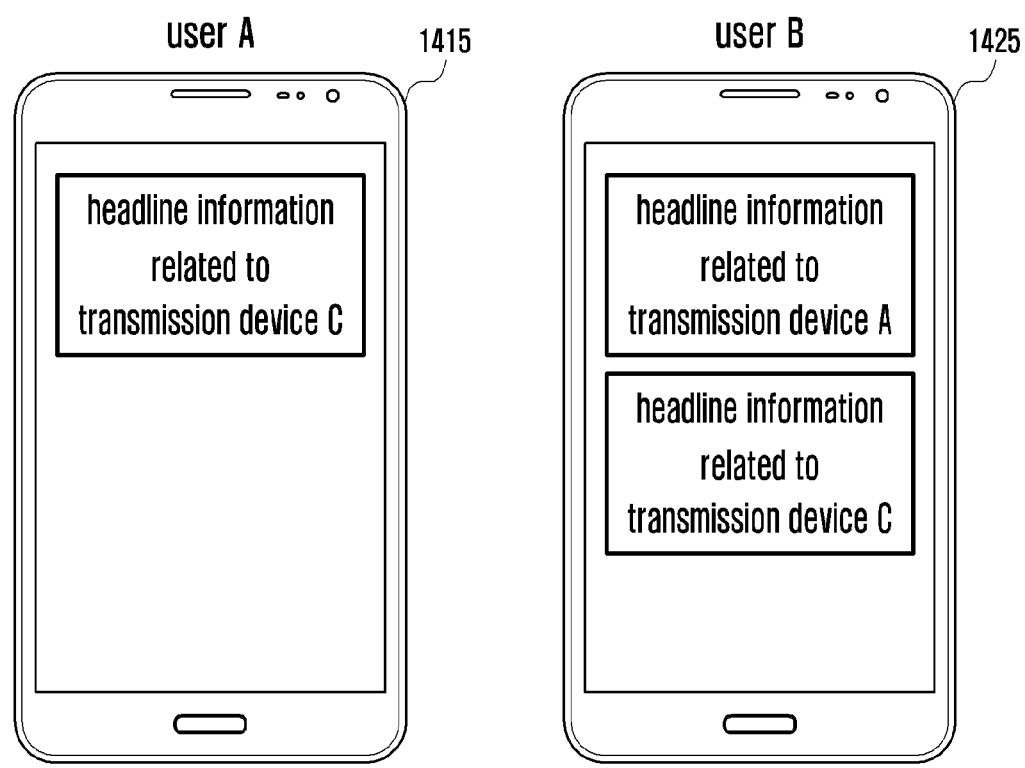

FIG. 14A is a screen view of an operation mode according to a location relationship between a beacon transmitting device and a beacon receiving device of FIG. 13 according to an embodiment of the present disclosure. FIG. 14A illustrates screens of reception devices when the reception device A is positioned at location A1 of FIG. 13 and the reception device B is positioned at location B1. The screen of each reception device may correspond to an operation mode or a service corresponding to the operation mode.

When the reception device A is positioned at location A1, the reception device A is beyond the second distance ranges of all of the transmission devices, so that the reception device A displays no information as indicated by reference numeral 1411. In contrast, the reception device B is positioned within the first distance range of the transmission device B. Accordingly, the reception device positioned within the first distance range of the transmission device B may extract operation mode information corresponding to distance information from the beacon signal transmitted by the transmission device B and output detailed information related to the transmission device B as illustrated in FIG. 14A as indicated by reference numeral 1421.

When the reception device A is positioned at the location A2, the reception device A is positioned within the second distance range of the transmission device A and within the second distance range of the transmission device B. Accordingly, the reception device A may extract operation mode information corresponding to distance information from the beacon signals transmitted by the transmission devices A and B and output headline information related to the transmission device A and headline information related to the transmission device B as indicated by reference numeral 1413 of FIG. 14B. Meanwhile, the reception device B may be positioned at the location B2. In this case, since the reception device B is beyond the second distance ranges of all of the transmission devices, the reception device B outputs no information as indicated by reference numeral 1423. Since the reception device B moves from the location B1 to the location B2, information, which has been output at the location B1, disappears.

When the reception device A is positioned at the location A3, the reception device A is positioned within the second distance range of the transmission device C. Accordingly, the reception device A may extract the operation mode corresponding to distance information from the beacon signal transmitted by the transmission device C and output headline information related to the transmission device C as indicated by reference numeral 1415 of FIG. 14C. In addition, the reception device B may be positioned at the location B3. In this case, the reception device B may be positioned within the second distance range of the transmission device A and within the second distance range of the transmission device C. Accordingly, the reception device B may extract operation mode information corresponding to distance information from the beacon signals transmitted by the transmission devices A and C and output headline information related to the transmission device A and headline information related to the transmission device C as indicated by reference numeral 1425 of FIG. 14C.

When the reception device receives beacon signals from a plurality of transmission devices, the reception device may determine priorities according to distance information. For example, when the reception device exists within both the first distance range of the transmission device A and the second distance range of the transmission device B, the reception device may give a higher priority to information on the beacon signal of the first transmission device, which is closer to the reception device, and output the information.

Further, the reception device may configure a preference of the transmission device. A weighted value may be assigned to the preference configured transmission device. For example, the weighted value may be assigned to the transmission device A. In this case, even when the reception device is positioned within the second distance range of the transmission device A, the reception device may output detailed information rather than the headline information according to the weighted value. Further, when the reception device is positioned within the second distance ranges of the transmission device A and the transmission device B, if the transmission device A has the weighted value, the reception device may give a higher priority to information of the transmission device A and output the information.

According to an embodiment of the present disclosure, the beacon transmitting device may apply different configurations to beacon signals according to a speed of the beacon transmitting device. For example, when a movement speed of the beacon transmitting device is fast, the beacon transmitting device may apply a weighted value to a distance configuration range as compared to a basic (e.g. default) speed, so as to control the distance range. Further, the beacon transmitting device may control transmission power when transmitting the beacon signal. For example, when the beacon transmitting device is farther away from the beacon receiving device, the beacon transmitting device may transmit the beacon signal by using higher transmission power. Further, when the beacon transmitting device moves closer to the beacon receiving device, the beacon transmitting device may reduce transmission power. When the transmission power is controlled, the beacon receiving device may estimate the distance between the beacon transmitting device and the beacon receiving device by using transmission power information in the beacon signal field and an RSSI of the measured signal. Further, an amount of information provided may be controlled according to the speed of the beacon transmitting device. For example, when the beacon transmitting device moves fast, the time for which the beacon transmitting device stays within a particular range is shorter. Accordingly, a larger weighted value is applied to the operation mode when the distance between the beacon transmitting device and the beacon receiving device is longer than the operation mode when the distance between the beacon transmitting device and the beacon receiving device is shorter.

When the fixed beacon transmitting device transmits the beacon signal through such a method, various modes may be applied according to the distance between the beacon transmitting device and the beacon receiving device. In this case, various modes may be determined according to the beacon-related information configuration of the beacon transmitting device. Beacon-related information may include operation mode information corresponding to distance information.

In the above description, although embodiments of the present disclosure are divided into several embodiments, it is only for convenience of description, and an operation through a combination of the divided embodiments is also possible.

The embodiments disclosed in the present disclosure and the accompanying drawings are provided merely to readily describe and to facilitate a thorough understanding of the present disclosure but is not intended to limit the scope of the present disclosure. Therefore, it should be construed that the present disclosure includes all modifications and changes or modified and changed forms derived from the present disclosure that are within the scope of the present disclosure, as defined by the appended claims and their equivalents.

What is claimed is:

1. A method of transmitting a beacon signal, the method comprising:
   configuring beacon-related information;
   generating a beacon signal based on the configured beacon-related information; and
   transmitting the beacon signal,
   wherein the beacon-related information includes at least one piece of mode information corresponding to distance information between a beacon transmitting device and at least one beacon receiving device, and
   wherein the at least one piece of mode information is determined depending on different distance levels between the beacon transmitting device and the at least one beacon receiving device within a maximum beacon transmission distance.

2. The method of claim 1, further comprising controlling, by the beacon signal, the mode information corresponding to the distance information between the beacon receiving device that receives the beacon signal and the beacon transmitting device.

3. The method of claim 1, wherein generating the beacon signal comprises inserting operation information corresponding to the distance information into a data field of a beacon signal field.

4. The method of claim 1, wherein configuring the beacon-related information comprises configuring operation information corresponding to a change in an increase/decrease of a distance between the beacon transmitting device and the beacon receiving device.

5. The method of claim 1, wherein configuring the beacon-related information comprises applying a weighted value to the distance information or a weighted value to the operation information in accordance with a movement speed of the beacon transmitting device.

6. The method of claim 1, wherein distance information between the beacon transmitting device and the beacon receiving device is determined based on received signal strength information (RSSI) concerning the beacon signal transmitted by the beacon transmitting device.

7. The method of claim 1, further comprising:
   receiving a response message concerning the beacon signal; and
   performing an operation corresponding to the response message,
   wherein the response message includes operation information for executing mode information corresponding to the distance information between the beacon receiving device that receives the beacon signal and the beacon transmitting device.

8. A beacon transmitting device for transmitting a beacon signal, the beacon transmitting device comprising:
   a communication unit configured to communicate with at least one network node; and
   a beacon controller configured to control configuration of beacon-related information, generate a beacon signal based on the configured beacon-related information, and transmit the beacon signal,
   wherein the beacon-related information includes at least one piece of mode information corresponding to distance information between a beacon transmitting device and at least one beacon receiving device, and
   wherein the at least one piece of mode information is determined depending on different distance levels between the beacon transmitting device and the at least one beacon receiving device within a maximum beacon transmission distance.

9. The beacon transmitting device of claim 8, wherein the beacon signal controls the mode information corresponding to the distance information between the beacon receiving device that receives the beacon signal and the beacon transmitting device.

10. The beacon transmitting device of claim 8, wherein the beacon controller is further configured to control insertion of operation information corresponding to the distance information into a data field of a beacon signal field to generate the beacon signal.

11. The beacon transmitting device of claim 8, wherein the beacon controller is further configured to control configuration of operation information corresponding to a change in an increase/decrease of a distance between the beacon transmitting device and the beacon receiving device to control the beacon-related information.

12. The beacon transmitting device of claim 8, wherein the beacon controller is further configured to control application of a weighted value to the distance information or a weighted value to the operation information in accordance with a movement speed of the beacon transmitting device to configure the beacon-related information.

13. The beacon transmitting device of claim 8, wherein the distance information between the beacon transmitting device and at least one the beacon receiving device is determined based on received signal strength information (RSSI) concerning the beacon signal transmitted by the beacon transmitting device.

14. The beacon transmitting device of claim 8, wherein the beacon controller is further configured to control reception of a response message concerning the beacon signal and perform an operation corresponding to the response message, wherein the response message includes operation information for executing mode information corresponding to the distance information between the beacon receiving device that receives the beacon signal and the beacon transmitting device.

* * * * *